(12) United States Patent
Endo

(10) Patent No.: US 6,449,062 B1
(45) Date of Patent: Sep. 10, 2002

(54) DATA TRANSMISSION METHOD ALTERING CONTENTS OF A PREVIOUS DATA TRANSMISSION

(75) Inventor: Hiroshi Endo, Tokyo (JP)

(73) Assignee: Oki Data Corporation, Tokyo (JP)

(*) Notice: Subject to any disclaimer, the term of this patent is extended or adjusted under 35 U.S.C. 154(b) by 0 days.

(21) Appl. No.: 09/273,287

(22) Filed: Mar. 19, 1999

(30) Foreign Application Priority Data

Mar. 25, 1998 (JP) .......................................... 10-096821

(51) Int. Cl.$^7$ ................................................. H04N 1/00
(52) U.S. Cl. .......................... 358/400; 358/468; 358/452
(58) Field of Search .................................. 358/400, 403, 358/452, 468, 402

(56) References Cited

U.S. PATENT DOCUMENTS 5,559,611 A * 9/1996 Bloomfield et al. ......... 358/468

* cited by examiner

Primary Examiner—Kimberly A. Williams

(57) ABSTRACT

A message is transmitted from a first communication machine to a second communication machine, stored in the second communication machine, then altered on command from the first communication machine before being output by the second communication machine. The alteration may take the form of adding, inserting, replacing, or deleting pages, or overlaying new image data on an existing page.

11 Claims, 22 Drawing Sheets

FIG. 13
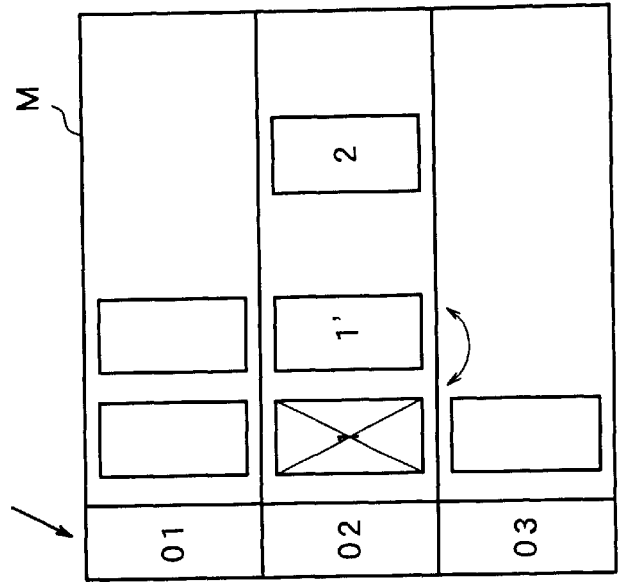
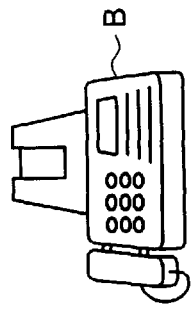
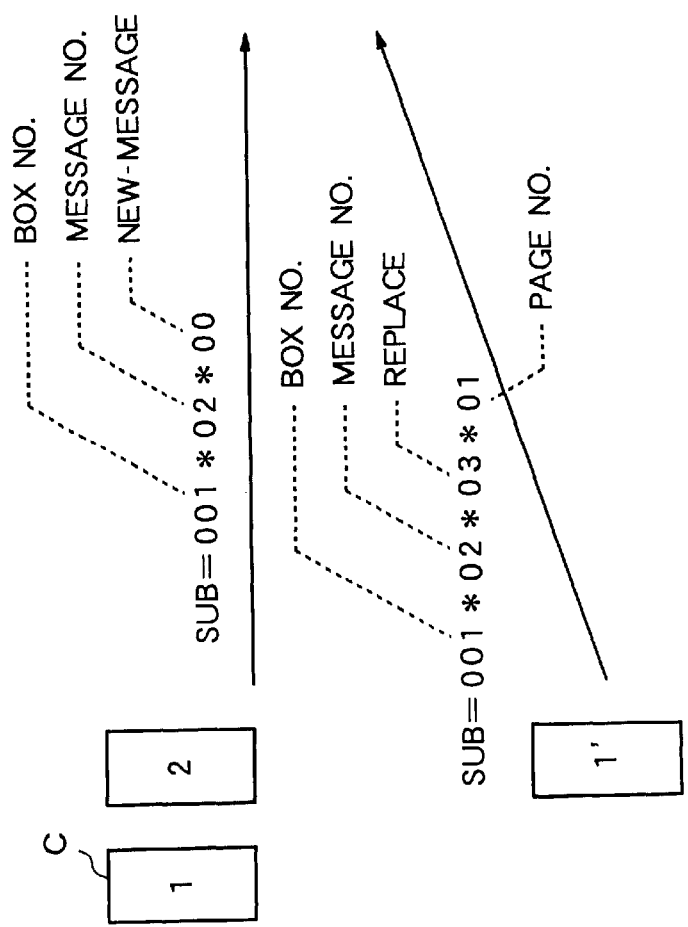
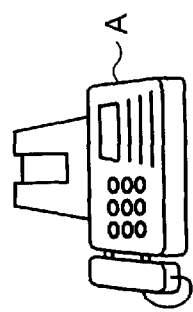

FIG. 16
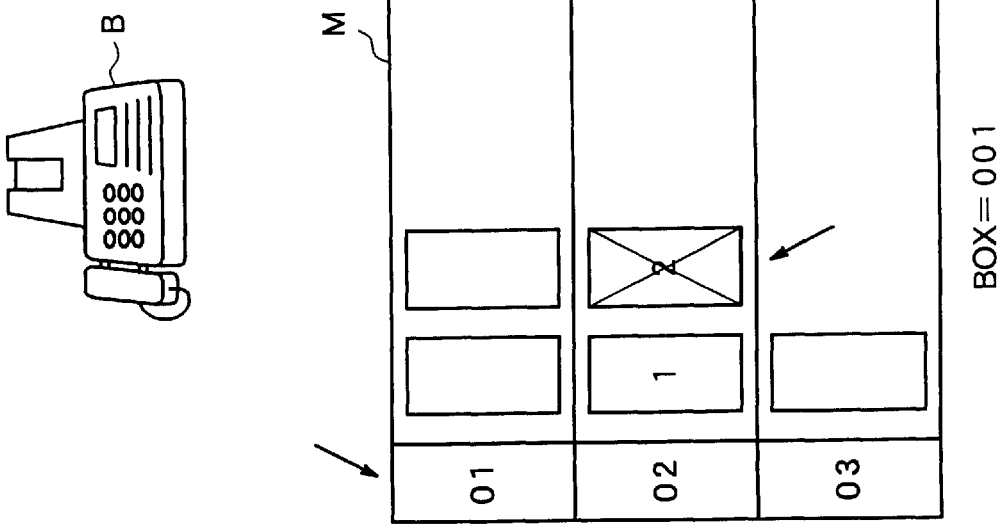
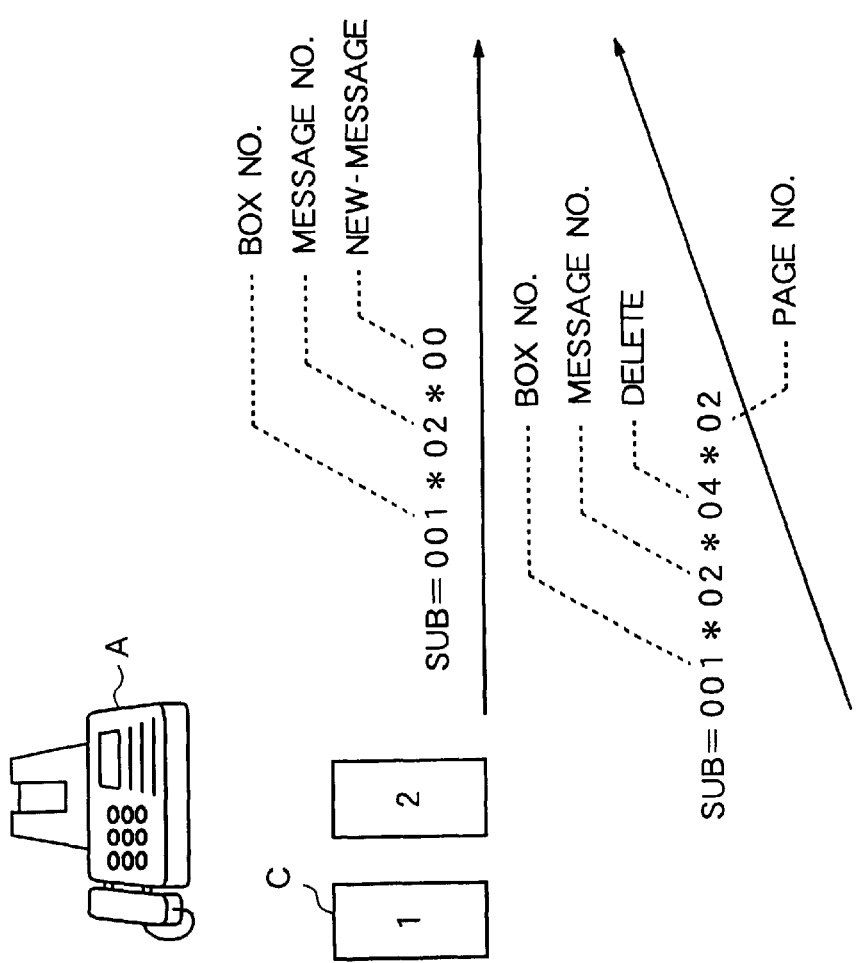

DATA1    DATA2

DATA3  DATA4
              DATA5
DATA6  DATA7

DATA8

DATA9

DATA10 DATA11 DATA12

| DATA1 | DATA2 | |
|---|---|---|
| DATA3 | DATA4 | DATA5 |
| DATA6 | DATA7 | |
| DATA8 | | |
| DATA9 | | |
| DATA10 | DATA11 | DATA12 |

DATA TRANSMISSION METHOD ALTERING CONTENTS OF A PREVIOUS DATA TRANSMISSION

BACKGROUND OF THE INVENTION

The present invention relates to a data transmission method usable, for example, in a facsimile machine that stores received documents in a mailbox before printing the documents.

A mailbox is a password-protected memory area in a facsimile machine, storing received facsimile image data addressed to a specific user. The mailbox function is implemented by use of the SUB (subaddress) signal defined in Recommendation T.30 of the Telecommunication Standardization Sector of the International Telecommunication Union (ITU-T), entitled "Procedures for Document Facsimile Transmission in the General Switched Telephone Network." Before sending a facsimile document, referred to in Recommendation T.30 as a message, the transmitting facsimile machine sends the SUB signal, followed by a subaddress designating a mailbox in the receiving facsimile machine. The receiving facsimile machine stores all pages of the received message in the designated mailbox, and does not print the message until the user of the mailbox gives a printing command.

Because of the limited size of the mailbox memory area, if the user does not check the mailbox often enough, the memory area may become full during the reception of a facsimile transmission, at which point the facsimile transmission is forced to end without being completed. Further facsimile transmissions to the mailbox are then disabled, until the user makes more space available by printing at least some of the stored messages.

A problem that arises in this situation is how to retransmit the facsimile message that was interrupted when the mailbox became full. A simple procedure is to retransmit the entire message, but this procedure is often wasteful, because the initial part of the message may already have been received and stored. If only the pages that could not be received are retransmitted, however, the user at the receiving facsimile machine may have difficulty matching these remaining pages with the part of the facsimile transmission that was received earlier. What the user of the transmitting facsimile machine would like to do is to send only the pages that could not be sent before, and have the receiving facsimile machine add them to the stored pages of the message.

Other problems associated with mailboxes include mistaken transmission of a message to the wrong mailbox, and problems that occur in facsimile transmission in general, such as transmission of unnecessary pages or omission of necessary pages.

SUMMARY OF THE INVENTION

It is accordingly an object of the present invention to enable pages to be added to a message that has already been transmitted, as part of the same message.

A more general object is to enable a message that is transmitted from a first communication machine to a second communication machine and is stored in a memory area in the second communication machine to be altered after being transmitted.

In the invented data transmission method, a first communication machine originates a first call to a second communication machine and transmits image data to the second communication machine. The image data are stored in a memory in the second communication machine, without being output immediately.

After the first call has been terminated, the first communication machine originates a second call to the second communication machine, and sends a command instructing the second communication machine to alter the image data transmitted in the first call. The image data stored in the memory are altered as instructed. Later, the altered image data are output at the second communication machine.

The alteration may comprise adding a new page to the pages already transmitted, inserting a new page, replacing a page, deleting a page, or overlaying new image data on a page. Some alterations, such as page deletion, can be made by altering control information associated with the stored image data, and all alterations may involve such alteration of control information. The alteration instructions may be sent to the second communication machine as part of a subaddress, specifying a mailbox in which the image data are stored in the second communication machine. dr

BRIEF DESCRIPTION OF THE DRAWINGS

In the attached drawings:

FIG. 13 illustrates the replacement of a page in a stored facsimile message;

FIG. 16 illustrates the deletion of a page from a stored facsimile message;

DETAILED DESCRIPTION OF THE INVENTION

Embodiments of the invention will be described with reference to the attached drawings. Each embodiment is a facsimile transmission procedure that alters stored image data. In drawings illustrating procedures or sequences, the steps will be numbered sequentially from step one (S1) in each drawing.

Figure 1:
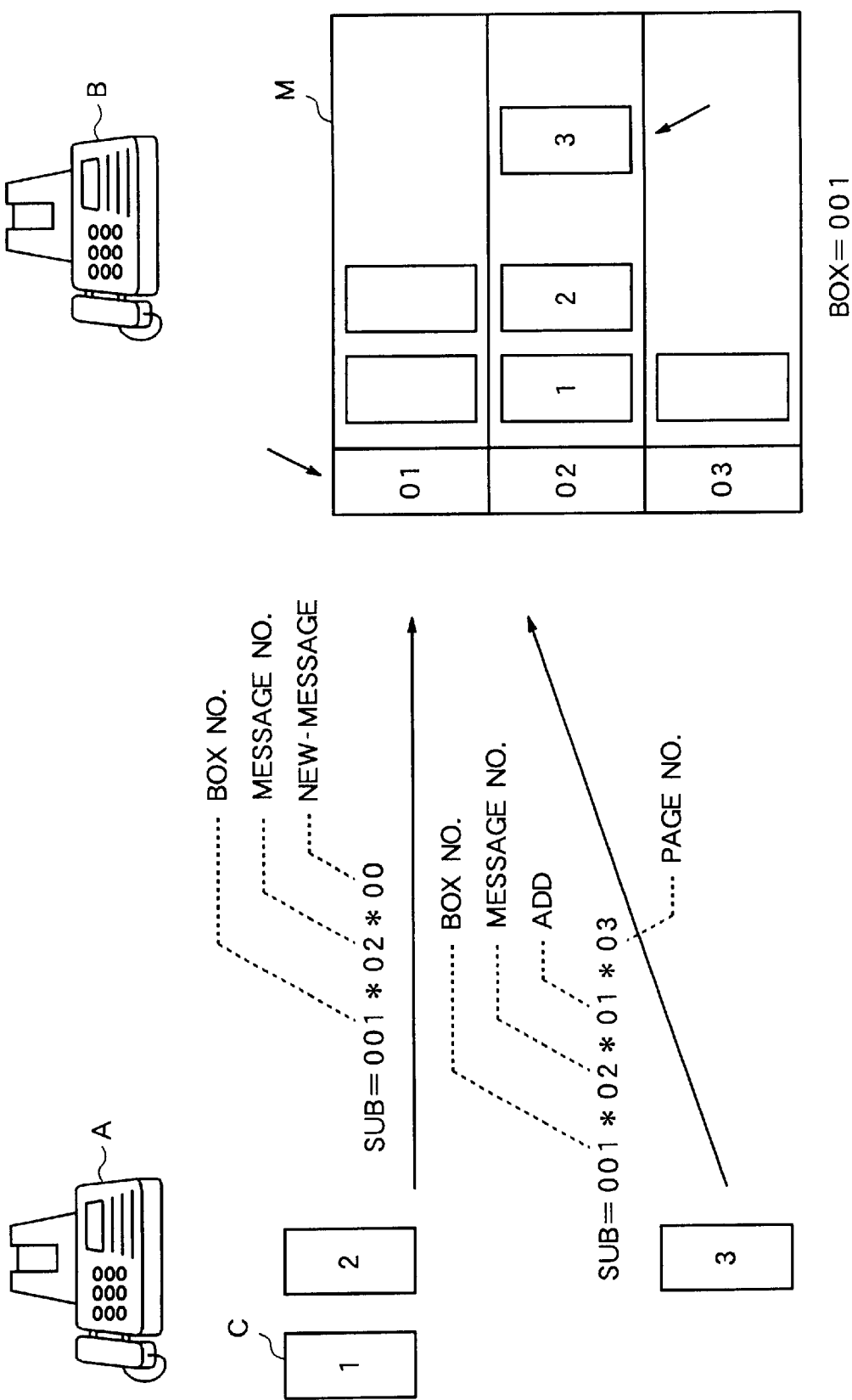
FIG. 1 illustrates the addition of a new page to a stored facsimile message.

As a first embodiment, FIG. 1 illustrates the addition of a further page to a stored facsimile message. Facsimile machine A begins by sending facsimile machine B a two-page document C. The two pages are numbered one and two in the drawing. Document C is sent to a mailbox M having box number 001 in facsimile machine B. The user of facsimile machine A sets pages one and two in facsimile machine A, then enters a new-message command designating mailbox M and assigning a message serial number to the message. Facsimile machine A originates a call to facsimile machine B, and sends a SUB signal followed by a subaddress comprising the box number (001), message serial number (02), and new-message command code (00). Facsimile machine B receives pages one and two, and stores them in mailbox M under the assigned message serial number.

Other facsimile messages sent to mailbox M are stored under different message serial numbers, as illustrated.

Afterward, the user of facsimile machine A discovers that document C had a third page, which should also have been sent. The user sets this third page in facsimile machine A and enters an add command, designating the same mailbox and message serial number as before, and giving the page number of the page to be added. Facsimile machine A originates a call to facsimile machine B and sends a SUB signal, the subaddress now comprising the box number (001) and message serial number (02), the add command code (01), and the designated page number (03). Facsimile machine B receives page three and stores it in mailbox M as part of the message with message serial number 02. When a user of facsimile machine B prints this message, pages one, two, and three will be printed in the correct sequence as a single message.

A more detailed description will now be given, starting with a description of facsimile machines A and B.

Figure 2:
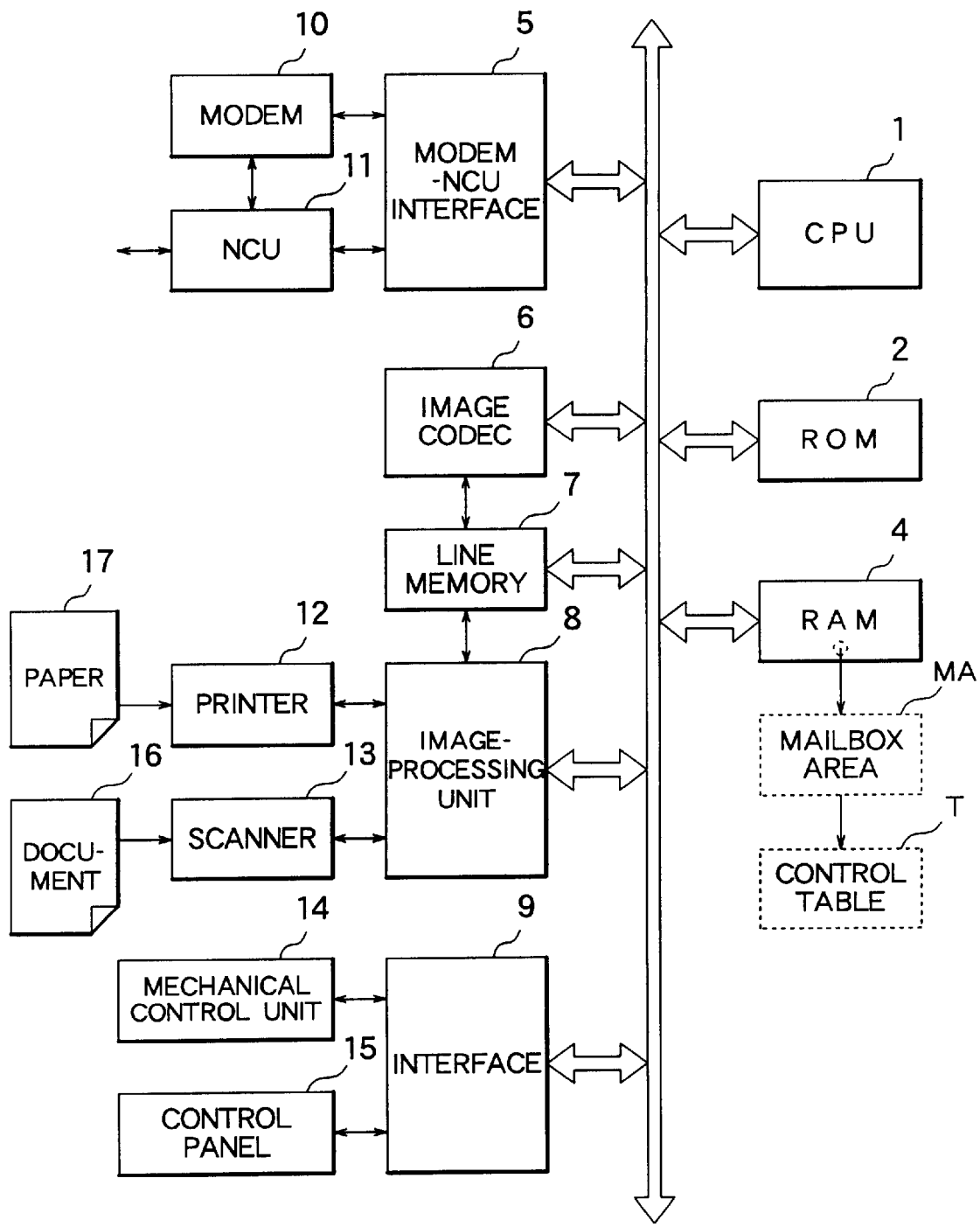
FIG. 2 is a block diagram of a facsimile machine.

Referring to FIG. 2, each of these facsimile machines comprises a control unit such as a central processing unit (CPU) 1, a read-only memory (ROM) 2, a random-access memory (RAM) 4, an address/data bus 3, a modem-NCU interface 5, an image coder-decoder or codec 6, a line memory 7, an image-processing unit 8, an interface 9, a modulator-demodulator or modem 10, a network control unit or NCU 11, a printer 12, a scanner 13, a mechanical control unit 14, and a control panel 15.

The CPU 1 executes control programs that perform overall control of the facsimile machine, including data flow control, communication control, and network control. These programs are stored in the ROM 2. One of the programs controls actions taken in response to a received subaddress. The CPU 1, ROM 2, and other components are interconnected by the address/data bus 3.

The RAM 4 is used for temporary storage of image data. The mailbox area MA occupies one part of the RAM 4. The mailbox area MA includes a message control table T.

The NCU 11 is connected to, for example, a subscriber line in a public telephone network. The NCU 11 sends address signals and performs various other functions necessary for transmitting and receiving data through the telephone network. The modem 10 modulates transmit data onto a transmitted signal, and demodulates a received signal to obtain received data, operating according to, for example, ITU-T Recommendation V.17 or V.34. The modem-NCU interface 5 couples the modem 10 and NCU 11 to the address/data bus 3.

The image codec 6 compresses image data for transmission, and decompresses received image data, using the line memory 7 for data storage. The line memory 7 stores one dot line of scanned or received image data. The image-processing unit 8 carries out various necessary processes on image data received from the scanner 13 and image data provided to the printer 12. The scanner 13 scans documents 16 to be transmitted. The printer 12 prints received documents on paper 17.

The mechanical control unit 14 comprises various drivers, sensors, and other components necessary for the mechanical operation of the facsimile machine. The control panel 15 has a keypad for entering telephone numbers and other information, and a display for displaying the entered information, and other information. When sending a facsimile message to a mailbox in another facsimile machine, the user uses the control panel 15 to designate the other facsimile machine and the mailbox.

When the facsimile machine in FIG. 2 transmits a document 16, the scanner 13 scans the document, and the image-processing unit 8 processes the raw image data received from the scanner 13. Each line of processed image data is temporarily stored in the line memory 7 and compressed by the image codec 6. The compressed image data are transferred over the address/data bus 3 to the RAM 4, which serves as a transmit buffer by temporarily storing the compressed data. From the RAM 4, the data are sent through the modem-NCU interface 5 to the modem 10 and modulated onto a carrier signal, which is transmitted through the NCU 11 to the telephone line.

When the facsimile machine receives a message for immediate printing, the incoming signal is received by the NCU 11 and demodulated by the modem 10 to obtain received data. The received data are transferred through the modem-NCU interface 5 and address/data bus 3 to the RAM 4, which serves as a receive buffer by temporarily storing the data. The received data are read from the RAM 4 and decompressed by decoding in the image codec 6, which places each decoded line in the line memory 7. The image-processing unit 8 processes the decoded data as necessary for printing, and supplies the processed data to the printer 12, which prints the image data on paper 17.

When the facsimile machine receives a message addressed to, for example, mailbox M, the same procedure is followed, except that the received data are left stored in mailbox M until the user enters a command to have the data printed. Associated control information is stored in the message control table T.

In addition to sending and receiving image data, the facsimile machine sends and receives other signals according to procedures standardized in ITU-T Recommendation T.30. These signals include binary signals encoding data generated by the CPU 1, which are sent over the address/data bus 3 to the modem-NCU interface 5 and transmitted by the modem 10 and NCU 11. When such signals are received, they are demodulated by the modem 10 and sent through the modem-NCU interface 5 and address/data bus 3 to the CPU 1.

Figure 3:
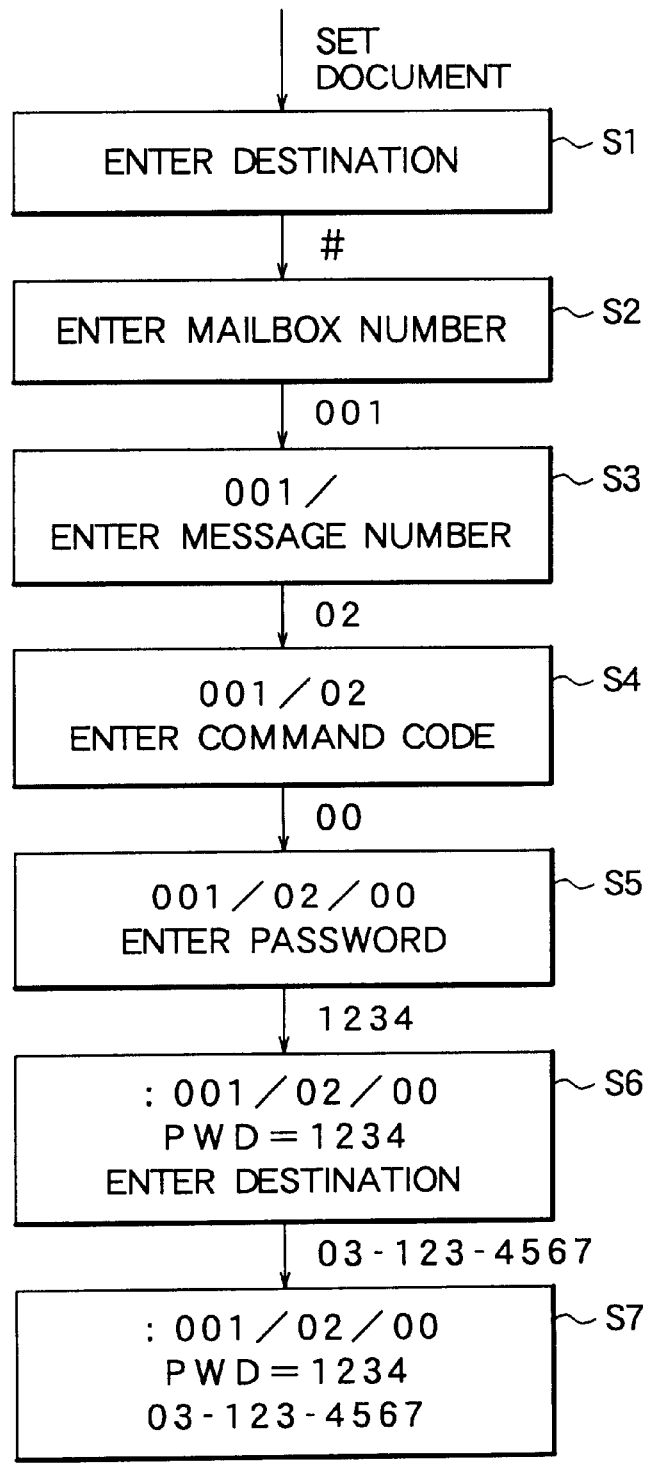
FIG. 3 is a flowchart illustrating the transmission of a facsimile document to a mailbox.

FIG. 3 illustrates the operations performed by the user of facsimile machine A in sending document C to mailbox M in facsimile machine B.

First, the user sets document C in a tray of the scanner 13 of facsimile machine A. The presence of the document is detected by a sensor in the mechanical control unit 14 and reported to the CPU 1. The CPU 1 responds by displaying a message such as "Enter destination" on the control panel 15 (step S1).

The user presses the sharp-sign key (#) on the keypad to indicate that the document is to be transmitted to a mailbox. The CPU 1 responds by displaying another message on the control panel 15, asking the user to enter the box number of the mailbox (step S2). The user enters the box number (001).

Next, the control panel 15 displays the entered box number and a further message, asking the user to enter a message serial number (step S3). The user enters a message serial number (02). The control panel 15 displays the entered number and another message, asking the user to enter a command code (step S4). The user enters the command code (00). The control panel 15 displays the entered command and another message, asking for a password (step S5). The user enters a password (1234). Facsimile machine B will not accept a document addressed to mailbox M unless the proper password is given. The control panel 15 displays the password and yet another message, asking again for the destination number (step S6). The user enters the number of facsimile machine B (03-123-4567).

The control panel 15 now displays all the information entered so far (step 7). The user checks the information, then presses a start button (not visible), at which point facsimile machine A originates a call to the designated destination number.

Figure 4:
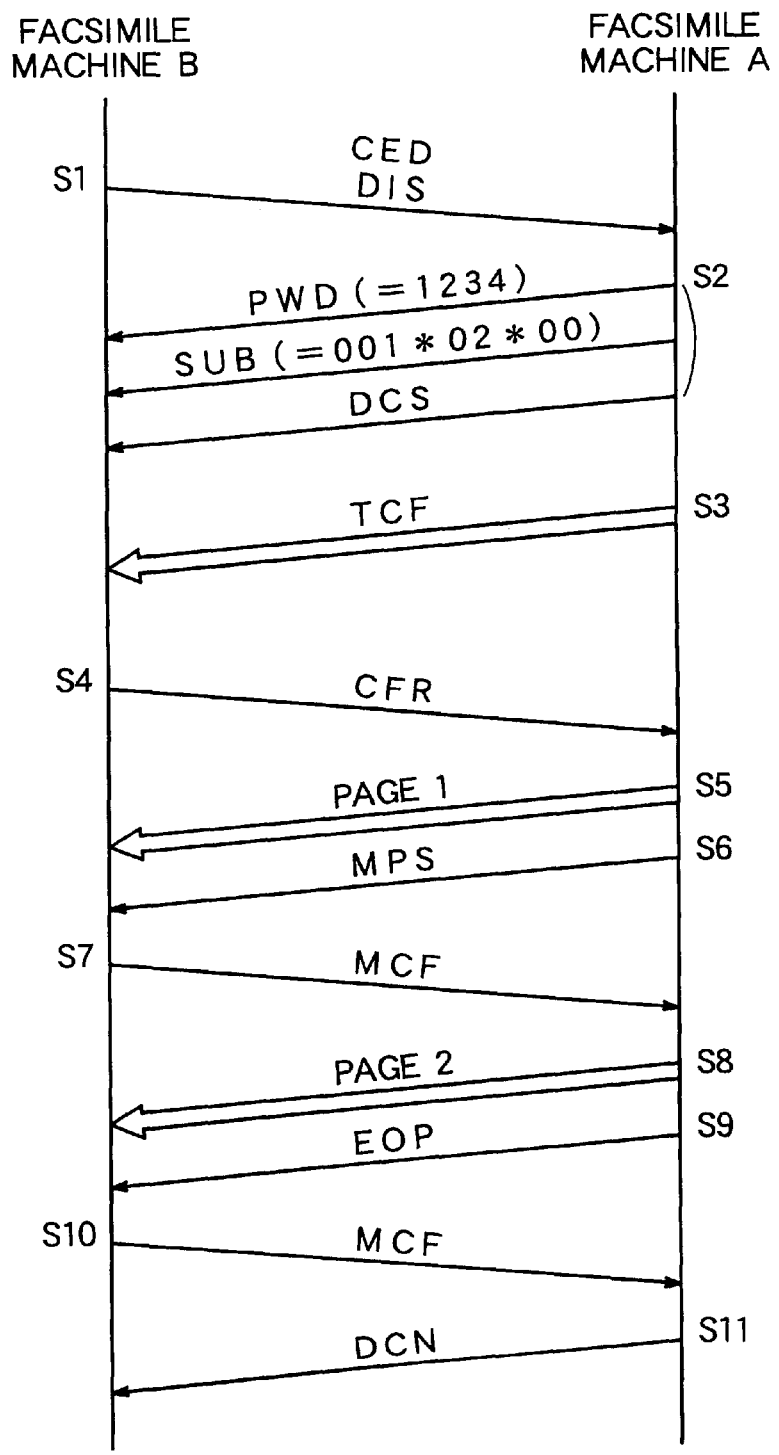
FIG. 4 is a protocol sequence diagram of a facsimile transmission addressed to a mailbox.

FIG. 4 illustrates the signaling protocol during the ensuing call. Table One below lists the meanings of the illustrated signals.

TABLE ONE

Facsimile Signal Names

| Abbreviation | Meaning |
| --- | --- |
| CED | Called station identification |
| CFR | Confirmation to receive |
| DCN | Disconnect |
| DCS | Digital command signal |
| DIS | Digital identification signal |
| EOP | End of procedure |
| MCF | Message confirmation |
| MPS | Multi-page signal |
| PWD | Password |
| SUB | Subaddress |
| TCF | Training check |

Upon detecting ringing signals, facsimile machine B goes off-hook and sends a called station identification signal (CED), followed by a digital identification signal (DIS), to facsimile machine A (step S1). Two of the bits set in the digital identification signal indicate that facsimile machine B can receive the password signal (PWD) and subaddress signal (SUB).

In the next step (step S2), facsimile machine A sends the password signal, followed by the password (1234) entered by the user, then the subaddress signal, followed by the subaddress information (**001\*02\*00**), and finally a digital command signal (DCS). The asterisks (\*) in the subaddress are delimiters separating different numbers and command codes. Facsimile machine B checks the password, and checks that the designated message serial number is available for use in the designated mailbox M.

Next, facsimile machine A sends a training check signal (TCF) to train and check the modem 10 in facsimile machine B (step S3). If the password and mailbox checks pass and the training check signal is received normally, facsimile machine B replies with a confirmation to receive (CFR, step S4).

Upon receiving this confirmation, facsimile machine A sends the compressed image data for the first page of document C (step S5), followed by a multi-page signal (MPS) indicating that there is another page to come (step S6). Facsimile machine B responds with a message confirmation (MCF) to indicate that the first page was received successfully (step S7). Facsimile machine A now sends the compressed image data for the second page (step S8), followed by an end-of-procedures signal (EOP) to indicate that this page is the last page (step S9). Facsimile machine B sends another message confirmation (step S10), and facsimile machine B sends a disconnect signal (DCN) to end the call (step S11).

At the end of the procedure in FIG. 4, the first two pages of document C are stored with message serial number 02 in mailbox M at facsimile machine B.

When the user of facsimile machine A finds that there is a third page to be transmitted, he or she follows a procedure similar to the one illustrated in FIG. 3, entering the same mailbox number (001) and message serial number (02), but entering a command code (01) designating addition of a further page, and entering the page number (03) of the further page.

Figure 5:
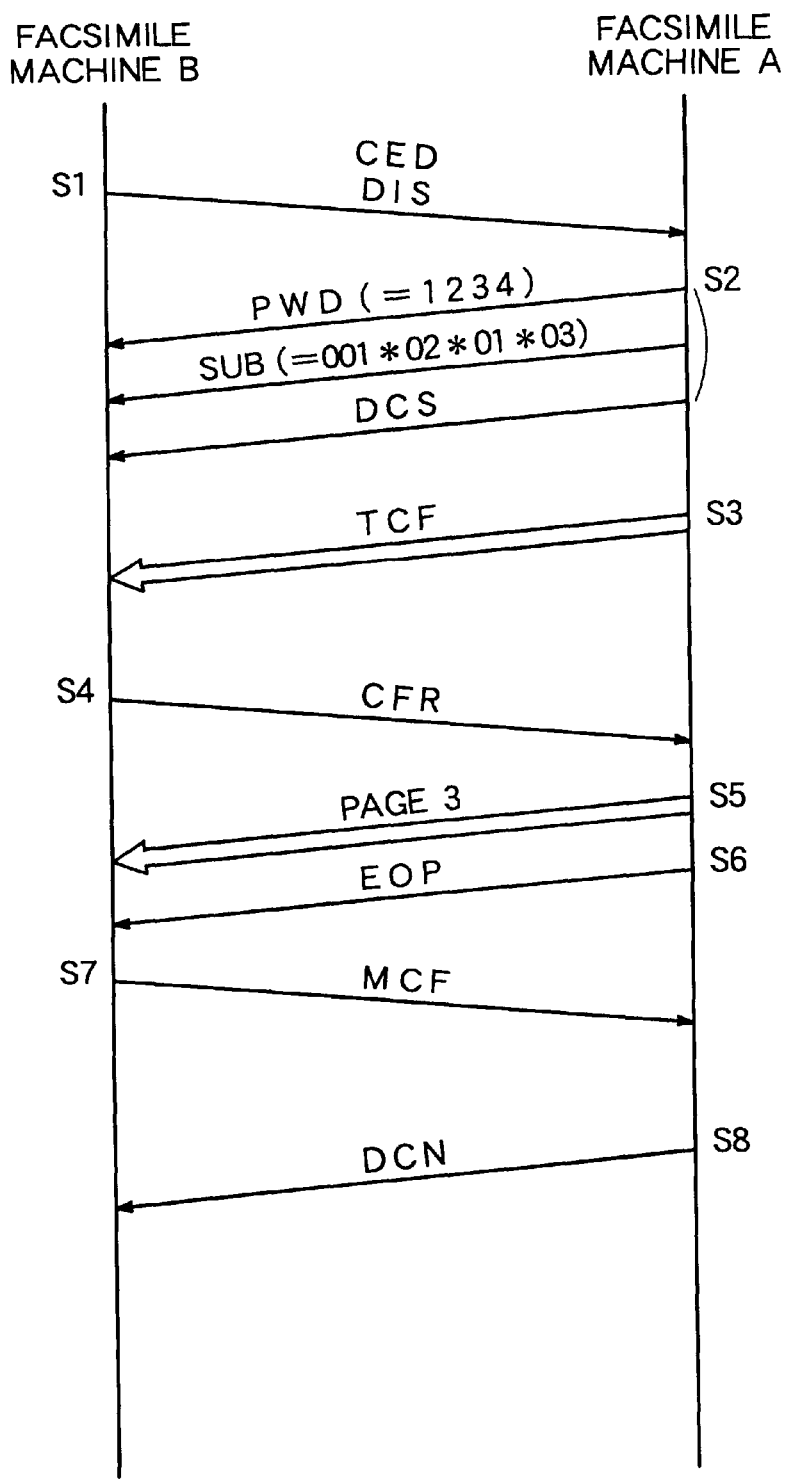
FIG. 5 is a protocol sequence diagram illustrating the addition of the new page.

When the user presses the start button, facsimile machine A originates another call to facsimile machine B, and the protocol sequence shown in FIG. 5 takes place. Steps S1 to S4 are as described above, except that the subaddress sent in step S2 is **001\*02\*01\*03**. In step S5, facsimile machine A sends the compressed image data of the third page of document C. Since this is the last page, it is followed by an end-of-procedures signal (step S6). Facsimile machine B replies with a message confirmation (step S7), and facsimile machine A sends a disconnect signal (step S8) to end the call.

Figure 6:
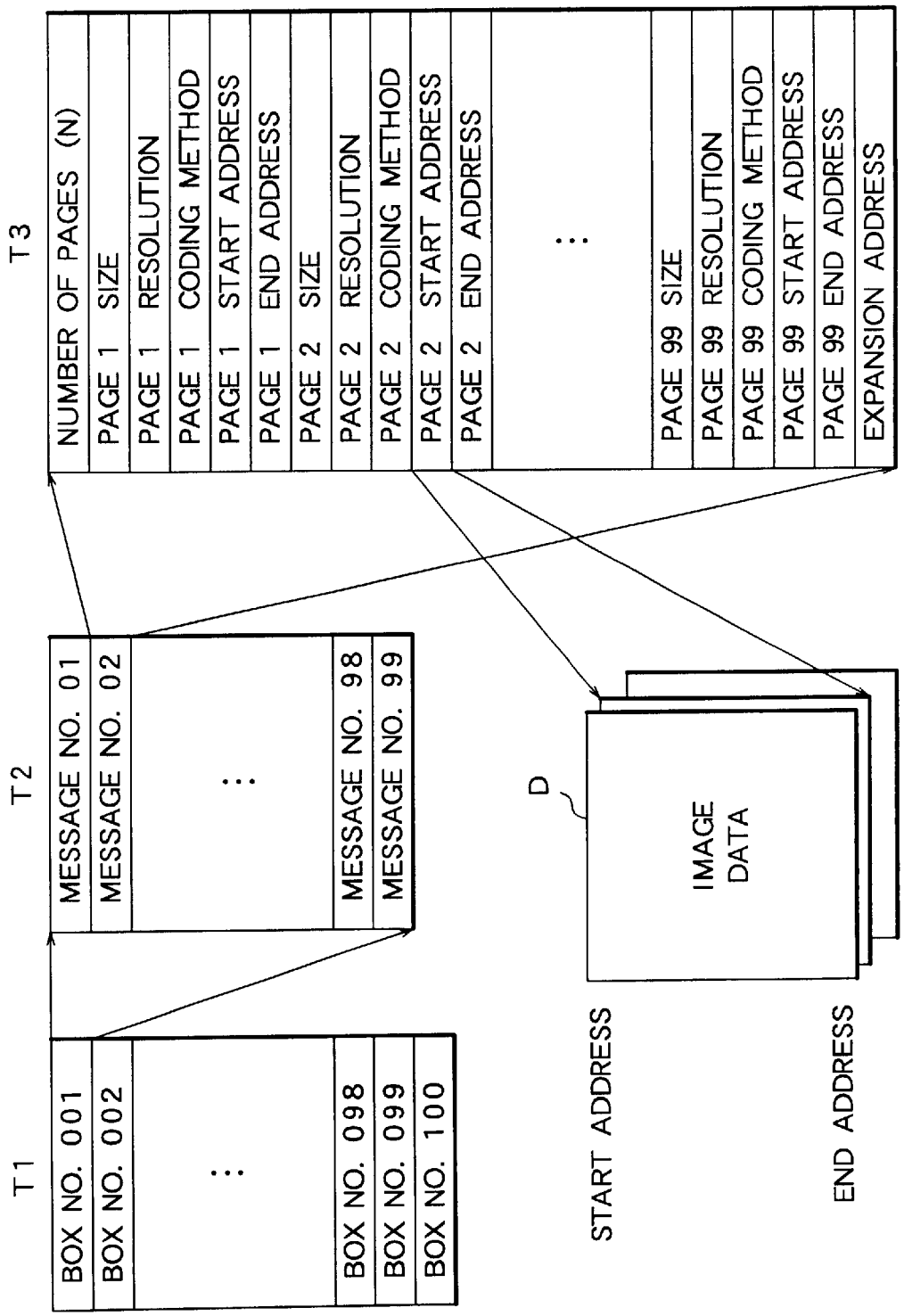
FIG. 6 illustrates the structure of the message control table in FIG. 2.

FIG. 6 illustrates the structure of the message control table in the RAM 4. The message control table is divided into hierarchical blocks. At the first hierarchical level (T1), the table comprises one hundred blocks (numbered 001 to 100), each associated with a different mailbox. At the second hierarchical level T2, each of these blocks is divided into ninety-nine sub-blocks (numbered 01 to 99) describing different messages stored in the mailbox. At the third hierarchical level (T3), each sub-block lists the page count, that is, the number of pages, in a message; the size, resolution, coding method, start address, and end address of each page; and an expansion address. When expansion is not necessary, the expansion address is set to zero. When a received document has more than ninety-nine pages, the CPU 1 finds free memory space in which to continue the sub-block, and stores the starting address of this space as the expansion address. The compressed image data D are stored separately, the data for each page being stored contiguously from the designated start address to the designated end address.

This table structure permits pages to be added to a stored message, as in the present embodiment, by storing their page information in the next available positions in the same message sub-block. Pages can also be inserted, deleted, or replaced, or combined with new image data, as will be described in later embodiments.

Figure 7:
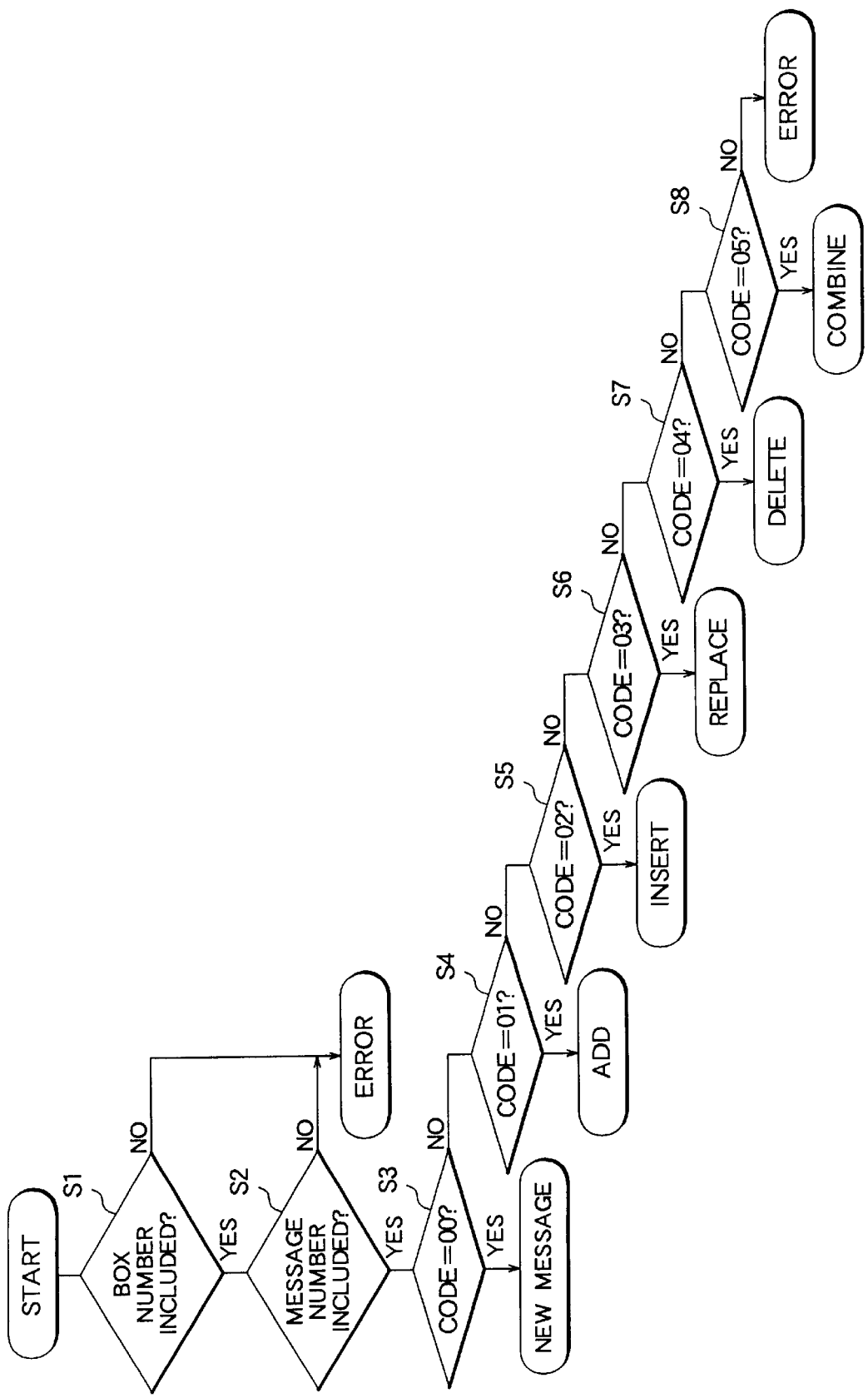
FIG. 7 is a flowchart illustrating a subaddress check performed in the receiving facsimile machine.

FIG. 7 illustrates the main flow of the program that controls the receiving of a message addressed to a mailbox, and in particular the flow of subaddress checking.

When a subaddress signal (SUB) is received, a series of checking steps is carried out. The first step (S1) checks that the subaddress signal is followed by the box number of a mailbox. The second step (S2) checks that the box number is followed by a message serial number. If either of these checks fails, appropriate error processing is carried out, such as sending a disconnect signal.

If the checks in steps S1 and S2 both pass, then the third step (S3) checks whether the command code following the message serial number is the new-message command code (00). If it is, the transmitted document is received as a new message, starting from page one. Steps S4 to S8 similarly detect other command codes (01 to 05) and branch to appropriate processing. If no valid command code is detected, yielding a negative decision result in step S8, error processing is carried out.

Figure 8:
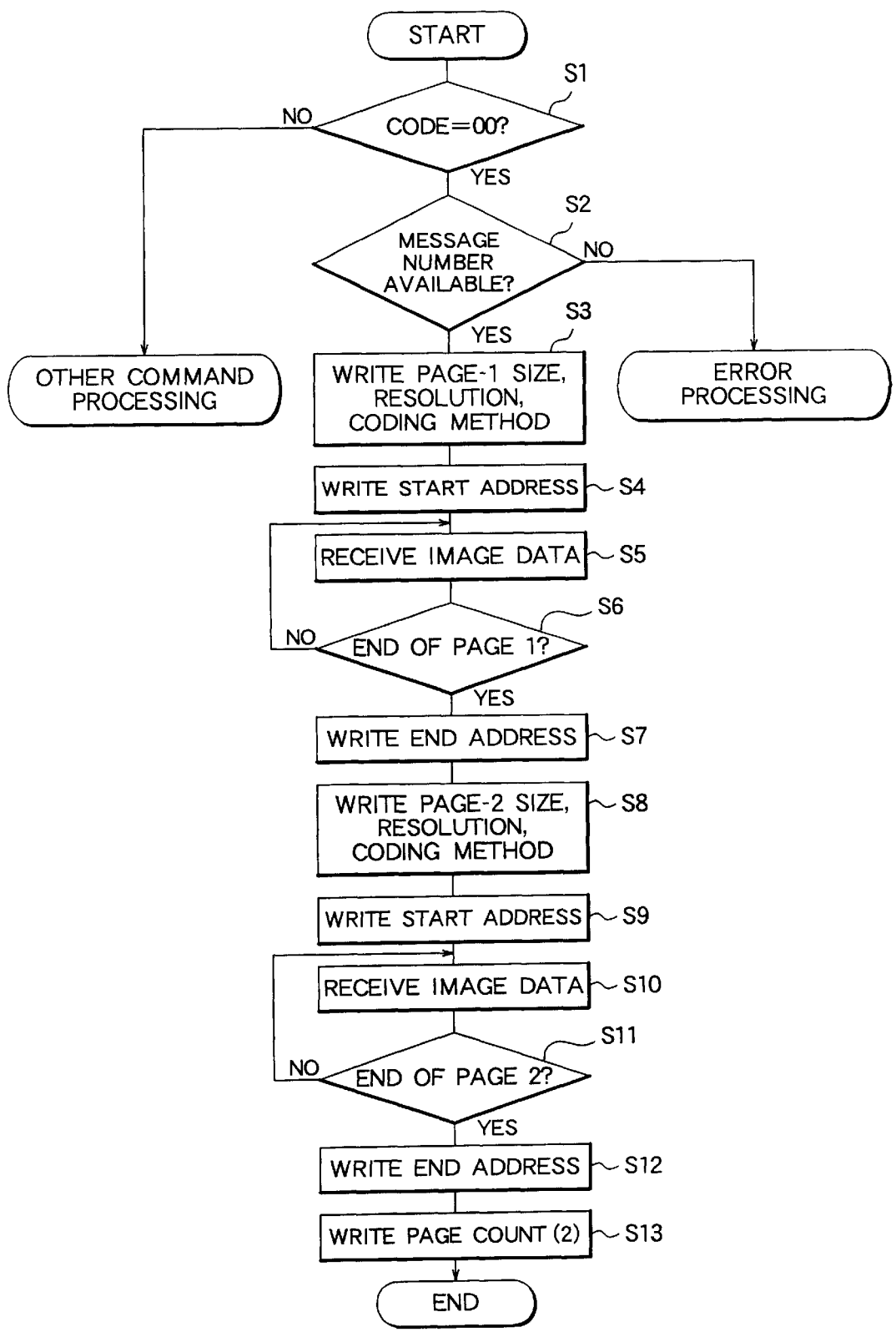
FIG. 8 is a flowchart illustrating the reception of a two-page facsimile message.

A detailed description of the reception of the first two pages of document C will now be given with reference to FIG. 8.

The subaddress check (step S1) detects the new-message command code (00), so new-message processing is carried out. If a different command were to be detected, other command processing would be carried out.

In the new-message command processing, the message control table is checked to see if a message is already stored under the designated message serial number (step S2). If a message is already stored under this message serial number, error processing is performed. If no message is stored under this serial number, then the page size, resolution, and coding method of the first page are written in the message control table. (step S3). This information is obtained from the digital command signal (DCS) that followed the subaddress. Next, a start address is written in the message control table (step S4). As compressed image data are received (step S5), the data are stored in the RAM 4, starting from the start address. When the end of the first page is recognized (step S6), the end address of the stored data is written in the message control table (step S7).

Next, the second page is received in the same way (steps S8, S9, S10, S11, S12). The second page is the last page of the transmission, so the number two (2) is written as the page count of this message (step S13). At this point, the disconnect signal is received and the facsimile transmission ends.

Figure 9:
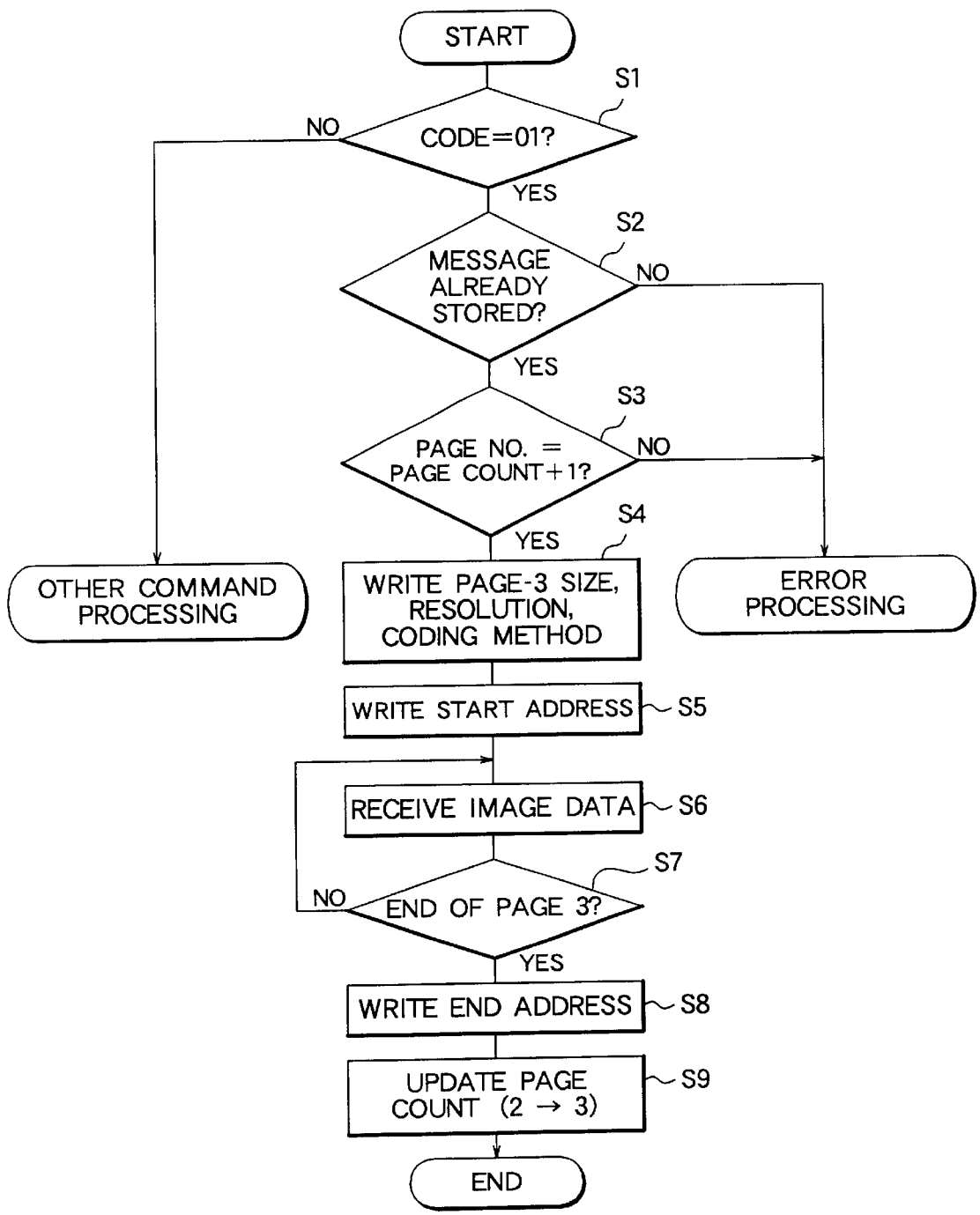
FIG. 9 is a flowchart illustrating the reception of an additional page.

Next, the reception of the third page in a separate facsimile transmission will be described, with reference to FIG. 9.

This time, the add command code (01) is recognized in the subaddress check (step S1). The message serial number is checked (step S2), and error processing is performed if no message is currently stored under the indicated message serial number. The page number designated in the subaddress is checked (step S3), and error processing is performed if the designated page number is not the next page number following the last page already stored; that is, if the designated page number is not equal to the stored page count plus one. If these checks pass, the third page is received in the same way as the first two pages (steps S4, S5, S6, S7, S8). The page information written in steps S4, S5, and S8 is written in the area reserved for page three in the second sub-block (02) of the first mailbox (001) in the message control table. Accordingly, although the third page is sent in a separate facsimile transmission, it is stored in the same way as if it had been received in the same transmission as the first two pages. Finally, the page count of the message is updated from two to three (step S9).

Later, when a user of facsimile machine B gives a command to print the stored message, all three pages are printed continuously, as if they had been received in a single facsimile transmission. The user does not have to hunt through a batch of stored messages to match the third page with the first two pages.

Next, a second embodiment will be described. The second embodiment inserts a new page between two pages already transmitted.

Figure 10:
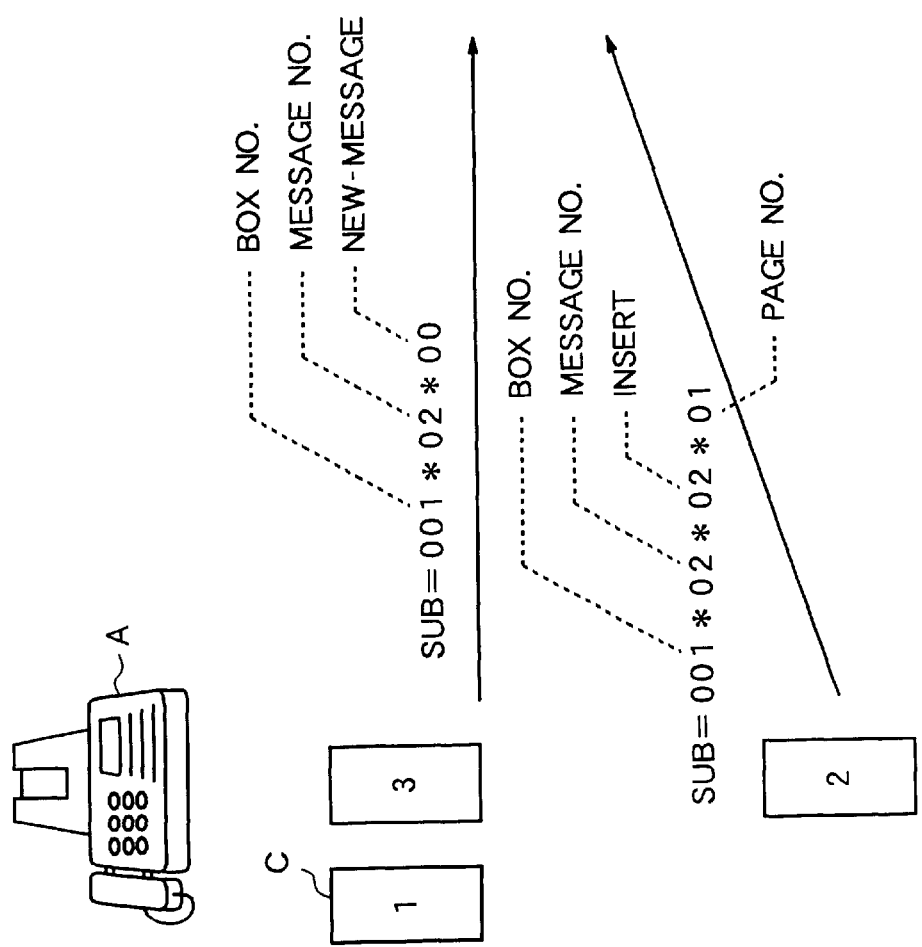
FIG. 10 illustrates the insertion of a new page into a stored facsimile message.

FIG. 10 illustrates the second embodiment. Facsimile machine A begins by sending facsimile machine B pages one and three of document C, page two being omitted by mistake. These two pages are sent in the same way as the two pages in the first embodiment, with subaddress **001\*02\*00**. Facsimile machine B receives pages one and three, and stores them in mailbox M as if they were pages one and two.

When the user of facsimile machine A discovers that page two was omitted, the user sets page two in facsimile machine A and enters an insert command code (02), designating the same box number (001) and message serial number (02) as before, and giving the page number of the page after which the new page is to be inserted (01). Facsimile machine A originates another call to facsimile machine B and sends a SUB signal, followed by a subaddress comprising the box number (001) and message serial number (02), the insert command code (02), and the designated page number (01). Facsimile machine B receives page two and stores it in mailbox M as page two of the message with the designated message serial number, renumbering the previously received page two as page three. When a user of facsimile machine B prints this message, pages one, two, and three are printed in the correct order as a single message.

Figure 11:
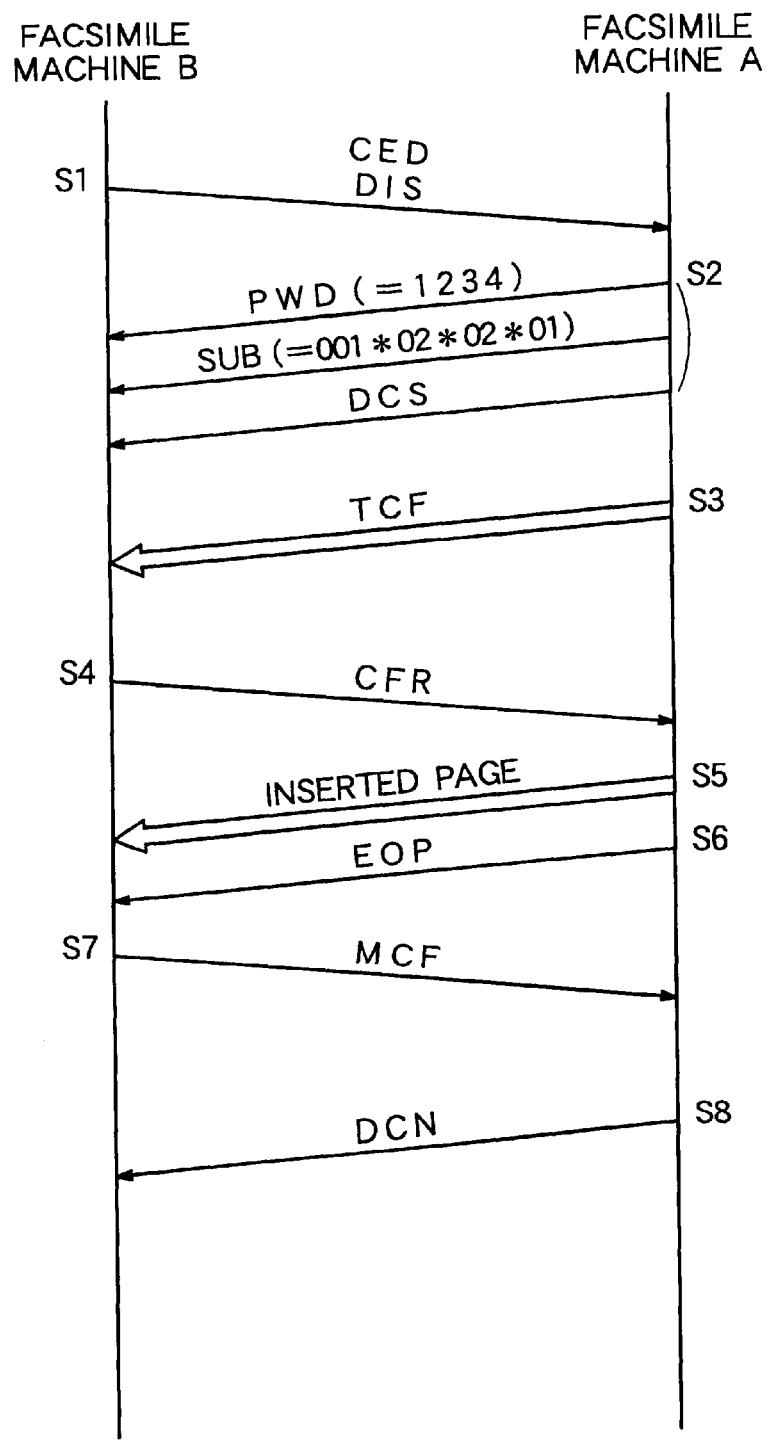
FIG. 11 is a protocol sequence diagram illustrating the insertion of the new page.

FIG. 11 illustrates the signaling sequence when page two is inserted. After receiving a called station identification signal (CED) and digital identification signal (DIS) from facsimile machine B (step S1), facsimile machine A sends a password (1234) and subaddress signal (SUB), followed by the subaddress **001\*02\*02\*01**, then a digital command signal (step S2). The last two parts of the subaddress instruct facsimile machine B to insert a new page after page one of the message designated by the first two parts of the subaddress. After a training check (step S3) and confirmation to receive (step S4), facsimile machine A sends the image data of the page to be inserted (step S5), followed by an end-of-procedures signal (step S6). Facsimile machine B returns a message confirmation signal (step S7), and facsimile machine A sends a disconnect signal (step S8) to end the transmission.

Figure 12:
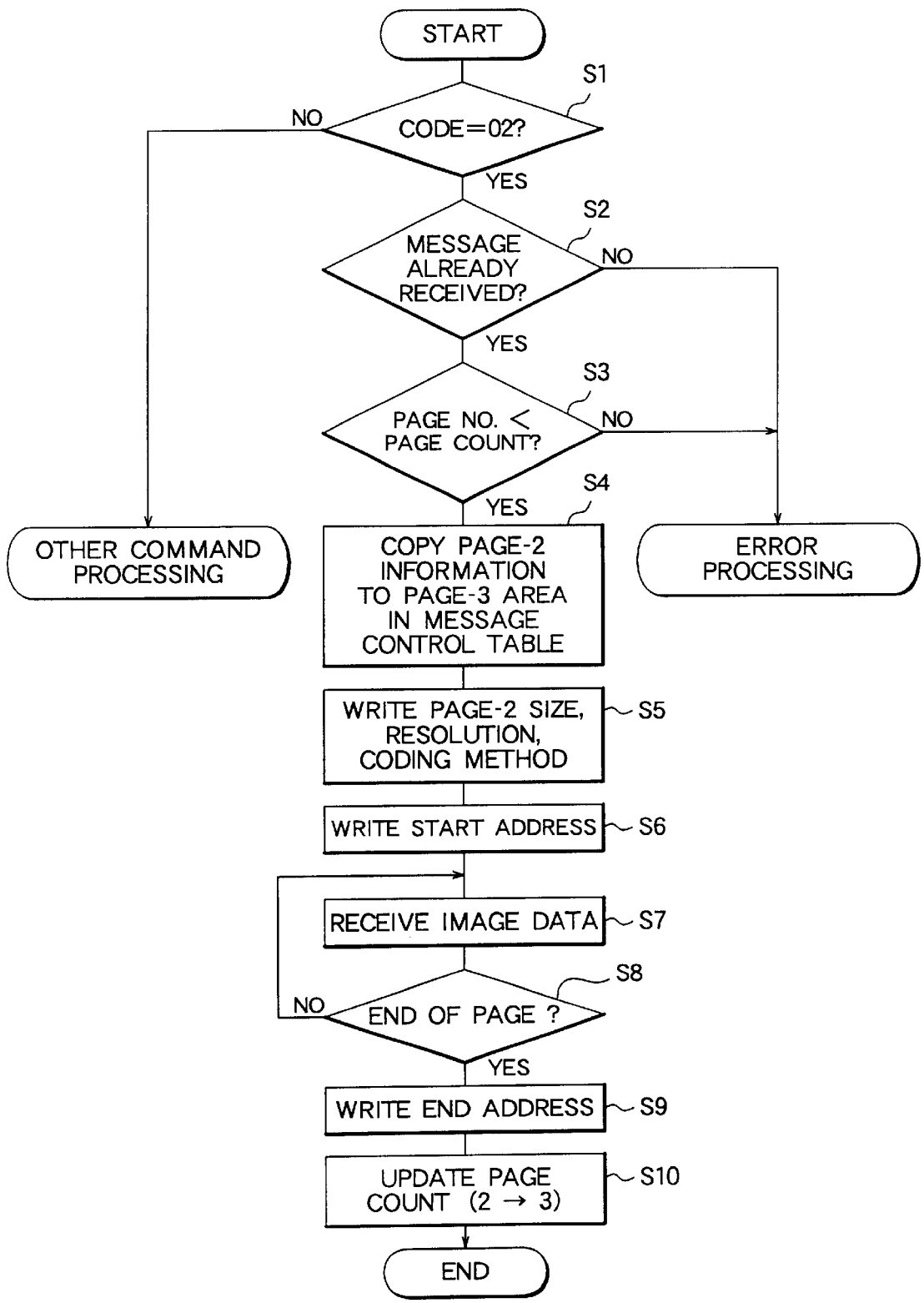
FIG. 12 is a flowchart illustrating the reception of the inserted page.

FIG. 12 illustrates the procedure by which facsimile machine B receives the inserted page. The insert command code (02) is recognized in the subaddress check (step S1). The message serial number is checked (step S2), and error processing is performed if no message is stored under the indicated message serial number. The page number designated in the subaddress is checked (step S3), and error processing is performed if the designated page is not already stored, or if the designated page is the last page already stored: that is, if the page number is not less than the page count.

If these checks pass, the message control table is updated by copying the page information currently describing page two to the area describing page three (step S4). The actual storage location of the image data for the previously received page does not change.

The new second page is then received in the manner already explained (steps S5, S6, S7, S8, S9). Its size, resolution, coding method, start address, and end address are recorded in the area in the message control table describing page two, overwriting the previous contents of this area. Accordingly, although the three pages of document C have been sent out of order, they are stored in the same way as if they had been sent in the correct order, in a single facsimile transmission. Finally, the page count of the message is updated from two to three (step S10).

When the message is printed, pages one, two, and three are printed continuously, in the correct order, as if they had been received in a single facsimile transmission. The user of facsimile machine B does not have to hunt for a stored message with a missing page that matches a page received separately.

When two or more pages are inserted, steps S4 to S9 are repeated for each newly inserted page, the page number of the insertion position increasing by one each time. The blocks of page information following the insertion position are shifted back by one position in the message control table as each new page is received. Alternatively, the information describing these pages can be copied to a separate memory area before any of the inserted pages are received, then copied to the appropriate position in the message control table after all of the inserted pages have been received.

Next, a third embodiment will be described. The third embodiment replaces a page sent previously with a new page.

FIG. 13 illustrates the third embodiment. Facsimile machine A begins by sending facsimile machine B a two-page document C, comprising pages one and two, in the same way as in the first embodiment, with subaddress 001*02*00. Facsimile machine B stores these pages as message number two in mailbox M.

Afterward, the user of facsimile machine A discovers a mistake on page one, and wishes to substitute a revised version of page one (page 1') for the page already sent. The user sets the revised page one in facsimile machine A and enters a replace command code (03), designating the same box number (001) and message serial number (02) as before, and giving the page number of the page that is to be replaced (01). Facsimile machine A originates another call to facsimile machine B and sends a SUB signal, followed by a subaddress comprising the box number (001) and message serial number (02), the replace command code (03), and the designated page number (01). Facsimile machine B receives the revised page one and stores it in mailbox M, replacing the previously received page one. The previously received page one is deleted, as indicated by the X-mark in the drawing.

When message number two is printed from mailbox number one, the revised page one is printed, followed by the previously received page two.

Figure 14:
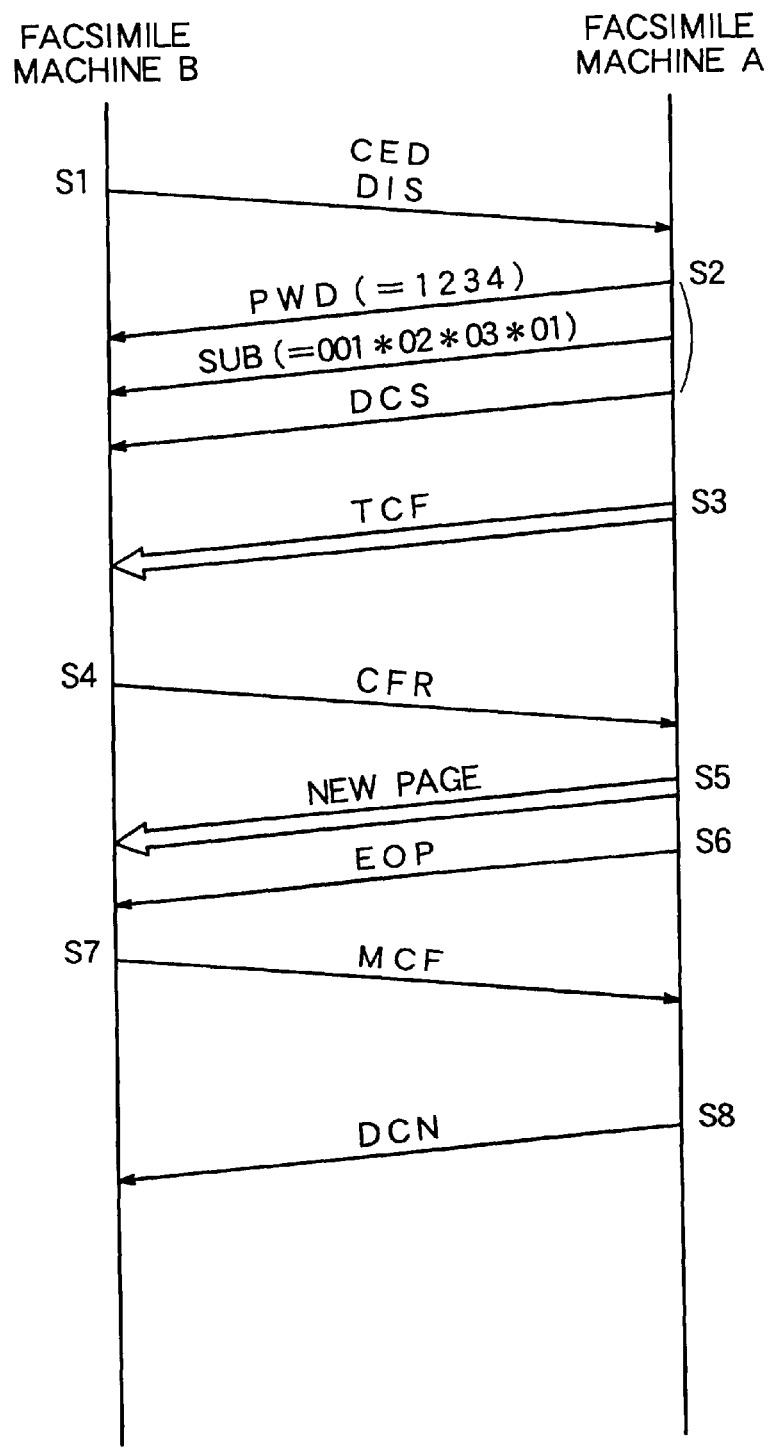
FIG. 14 is a protocol sequence diagram illustrating the transmission of a replacement page.

FIG. 14 illustrates the signaling sequence when page one is replaced. After receiving a called station identification signal (CED) and digital identification signal (DIS) from facsimile machine B (step S1), facsimile machine A sends a password (1234) and subaddress signal (SUB), followed by the subaddress 001*02*03*01, then a digital command signal (step S2). The last two parts of the subaddress instruct facsimile machine B to replace page one of the message designated by the first two parts of the subaddress. After a training check (step S3) and confirmation to receive (step S4), facsimile machine A sends the new image data of page one (step S5), followed by an end-of-procedures signal (step S6). Facsimile machine B returns a message confirmation signal (step S7), and facsimile machine A sends a disconnect signal (step S8) to end the transmission.

Figure 15:
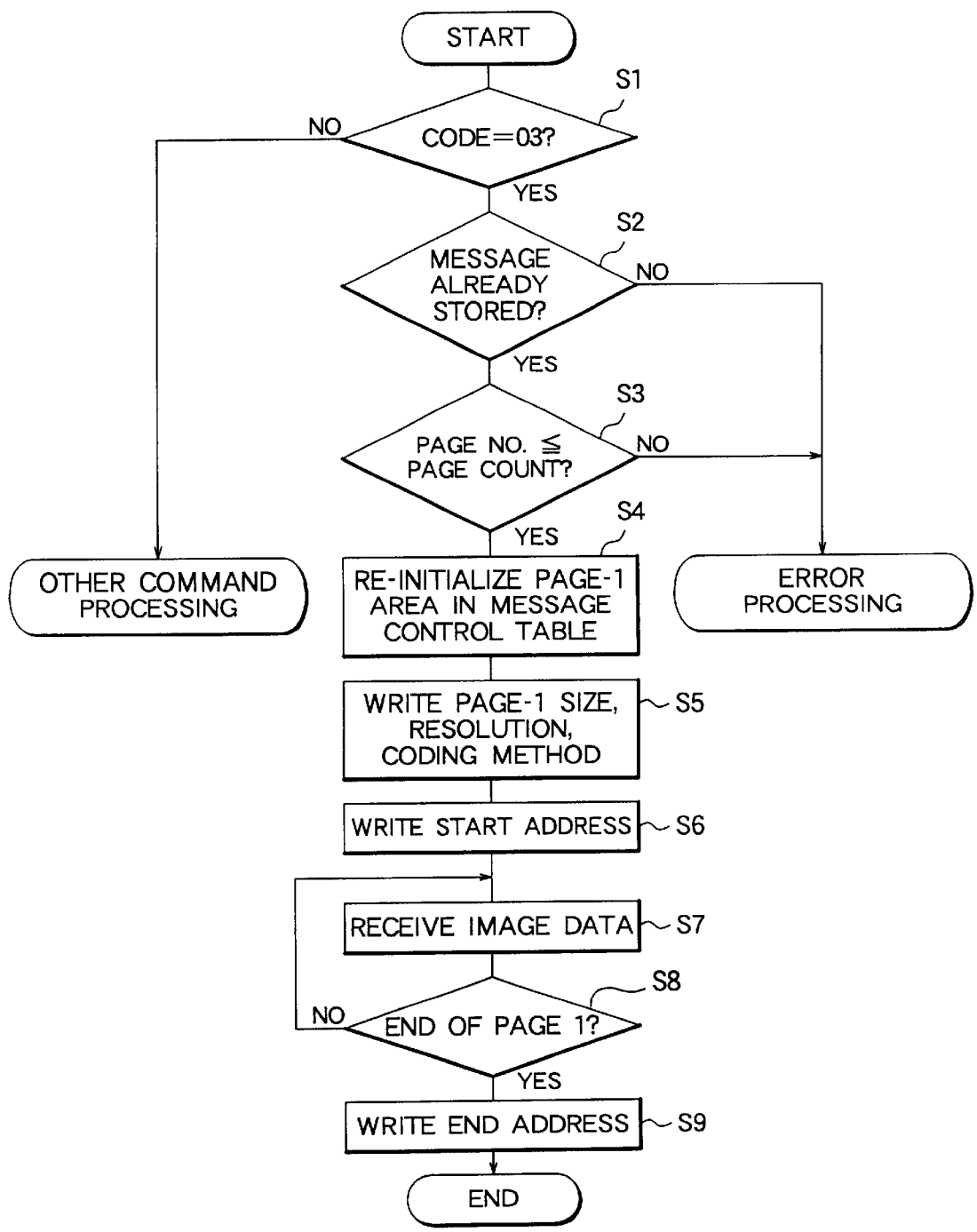
FIG. 15 is a flowchart illustrating the reception of the replacement page.

FIG. 15 illustrates the procedure by which facsimile machine B receives the inserted page. The replace command code (03) is recognized in the subaddress check (step S1). The message serial number is checked (step S2), and error processing is performed if no message is stored under the indicated message serial number. The page number designated in the subaddress is checked (step S3), and error processing is performed if the designated page is not stored. If these checks pass, the area describing this page in the message control table is re-initialized in preparation for the replacement, the existing information about page one thus being deleted (step S4).

The new page one is received in the same manner as before (steps S5, S6, S7, S8, S9). Its size, resolution, coding method, start address, and end address are recorded in the area re-initialized in step S4. The revised image data are stored between the new start address and new end address.

When message number two is printed, the revised version of page one is printed. The old version of page one is not printed, because the information pointing to the old image data has been deleted from the message control table. The user of facsimile machine B accordingly sees only the correct version of page one.

In the procedure shown in FIG. 15, step S4 can be omitted. The new page size, resolution, coding method, start address, and end address of page one can overwritten directly on the old page size, resolution, coding method, start address, and end address.

Next, a fourth embodiment will be described. The fourth embodiment deletes a page from a previous facsimile transmission.

FIG. 16 illustrates the fourth embodiment. Facsimile machine A begins by sending facsimile machine B two pages (pages one and two) as in the first embodiment, with subaddress 001*02*00. Facsimile machine B stores these pages as message number two in mailbox M.

The user of facsimile machine A then realizes that page two should not have been sent to mailbox M. Hoping that the user of mailbox M has not yet printed the message, the user of facsimile machine A enters a delete command code (04), designating the same box number (001) and message serial number (02) as before, and giving the page number of the page to be deleted (02). Facsimile machine A originates another call to facsimile machine B and sends a SUB signal, followed by a subaddress comprising the box number (001) and message serial number (02), the delete command code (04), and the designated page number (02). If message number two of mailbox M has not yet been printed, facsimile machine B deletes the information about page two of this message from the message control table. When the user of mailbox M prints the message, only page one is printed.

Figure 17:
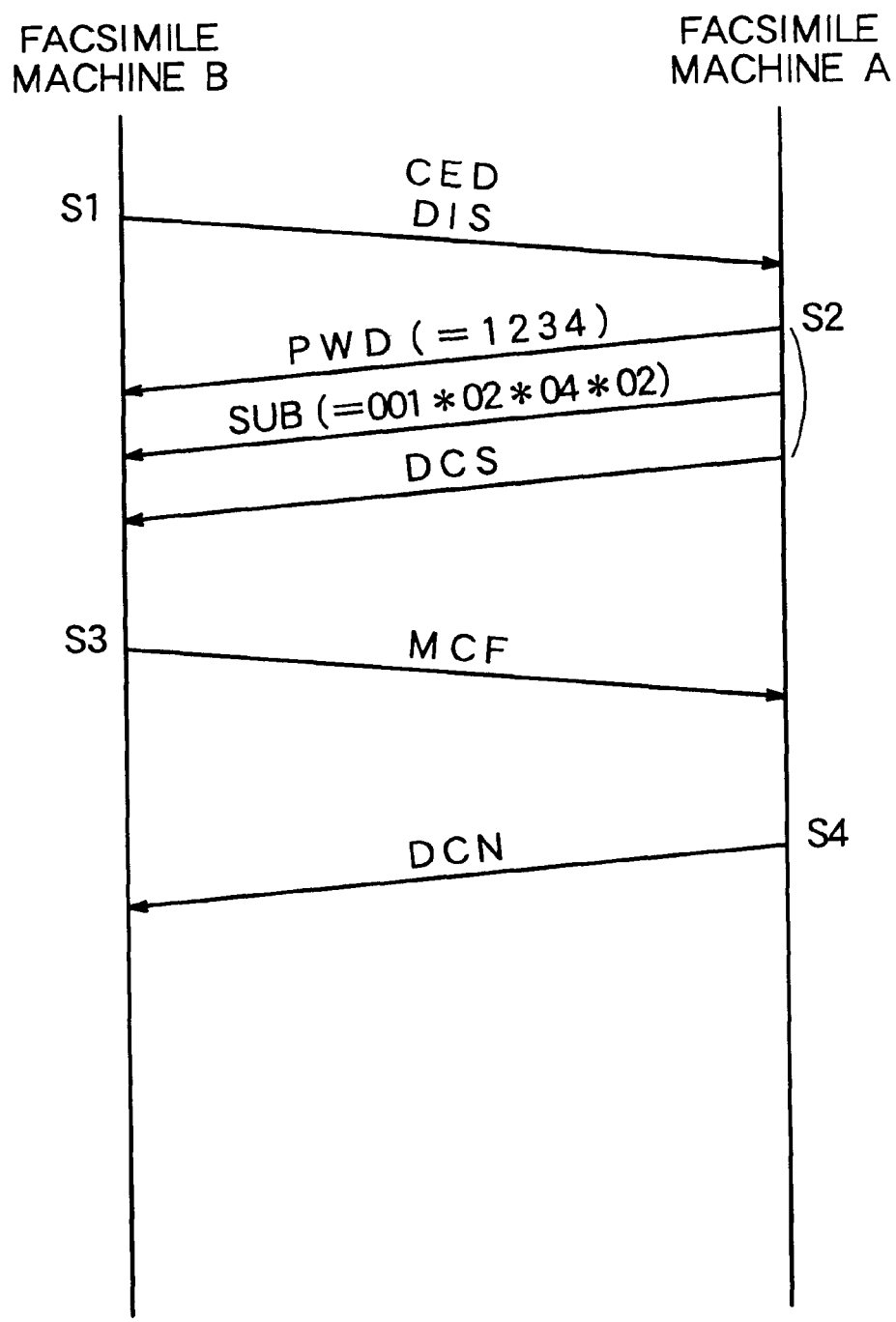
FIG. 17 is a protocol sequence diagram illustrating the transmission of the deletion command.

FIG. 17 illustrates the signaling sequence when page two is deleted. After receiving a called station identification signal (CED) and digital identification signal (DIS) from facsimile machine B (step S1), facsimile machine A sends a password (1234) and subaddress signal (SUB), followed by the subaddress 001*02*04*02, then a digital command signal (step S2). The last two parts of the subaddress instruct facsimile machine B to delete page two of the message designated by the first two parts of the subaddress. Facsimile machine B deletes the designated page by updating the message control table, and returns a message confirmation signal (step S3). Facsimile machine A then sends a disconnect signal (step S4) to end the transmission. No image data are transmitted in this sequence.

Figure 18:
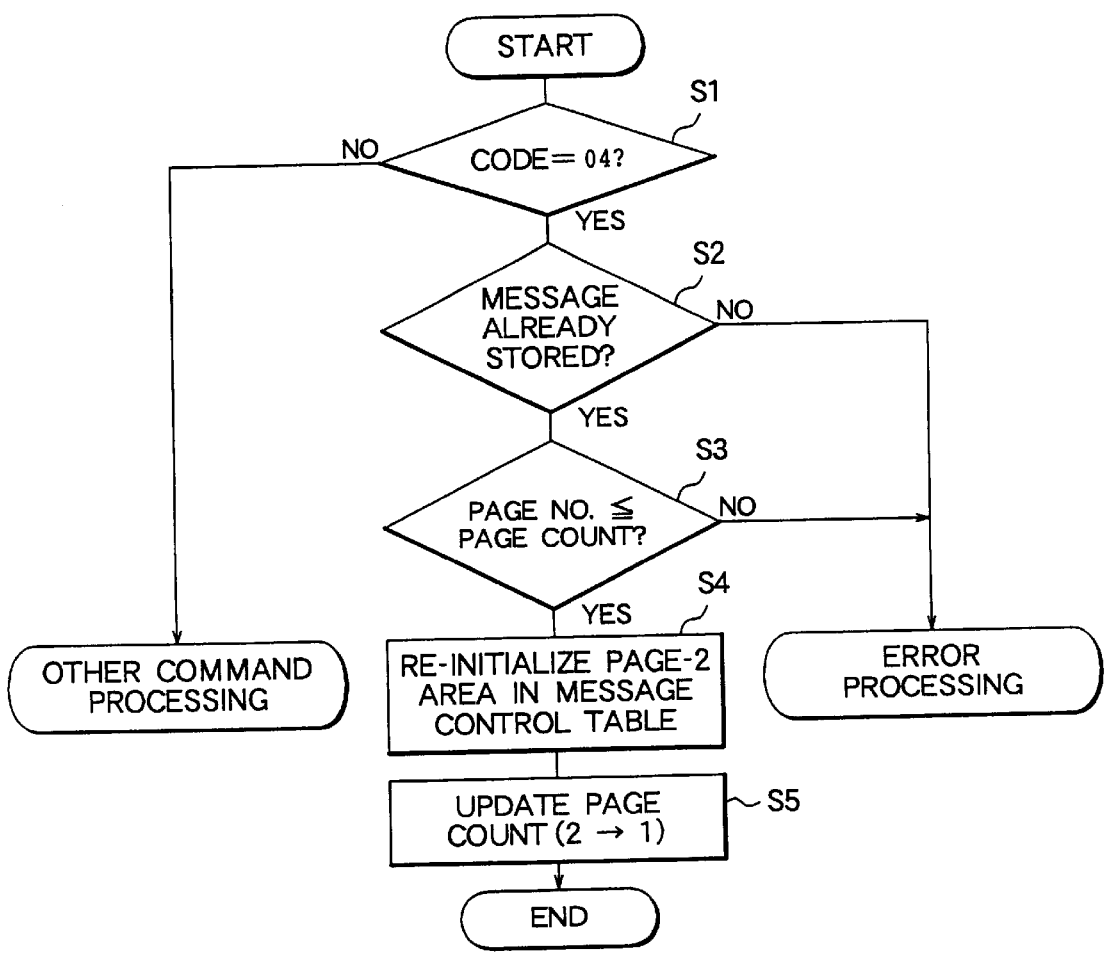
FIG. 18 is a flowchart illustrating the reception of the deletion command.

FIG. 18 illustrates the deletion procedure at facsimile machine B. The delete command code (04) is recognized in the subaddress check (step S1). The message serial number is checked (step S2), and error processing is performed if no message is stored under the indicated message serial number. The page number designated in the subaddress is checked (step S3), and error processing is performed if the designated page is not stored. If these checks pass, the message control table is updated by re-initializing the area currently describing page two, thus deleting the information giving the size, resolution, coding method, start address, and end address of this page (step S4). The actual image data do not have to be re-initialized. Finally, the page count of the message is updated from two to one (step S5). When message number two is printed, only page one is printed, as if page two had never been transmitted.

Two or more pages can be deleted by specifying their page numbers in the subaddress. For example, the delete command may indicate that pages five to ten are to be deleted. If the deleted pages are not the last pages of the message, following the deletion of their information from the message control table, the page information describing the following pages is copied forward in the message control table, so that no gap is left.

Next, a fifth embodiment will be described. The fifth embodiment adds new material to a page sent previously.

Figure 19:
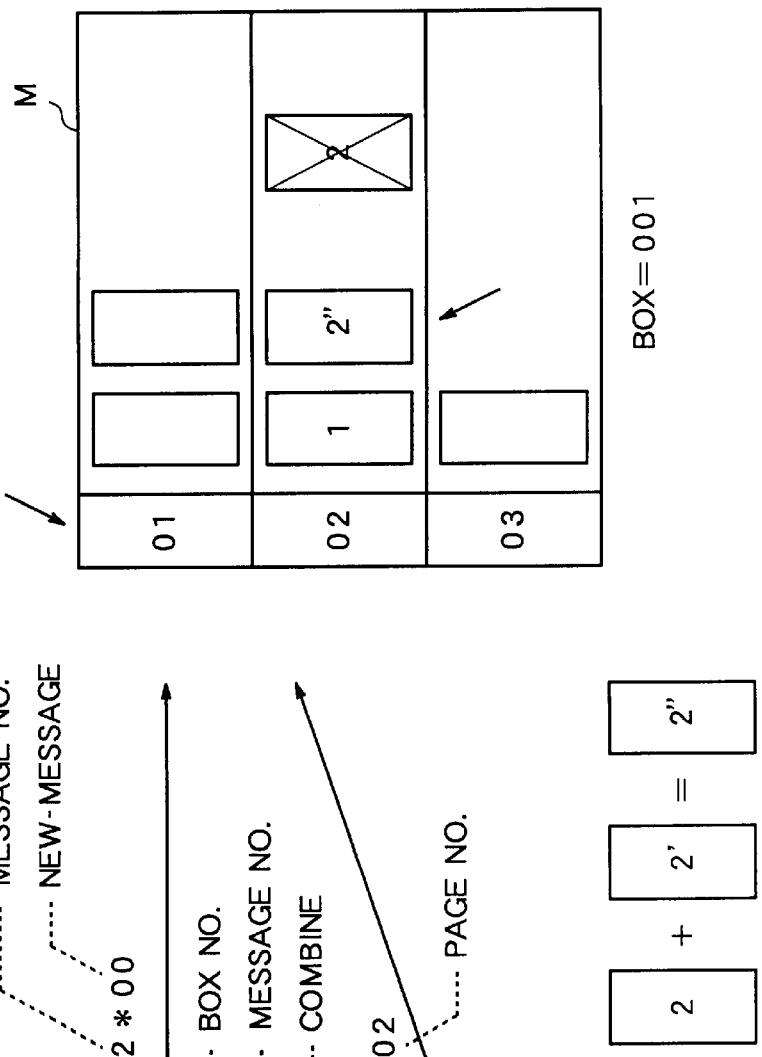
FIG. 19 illustrates the modification of an existing page in a stored facsimile message.
Figures 20, 21, 22:
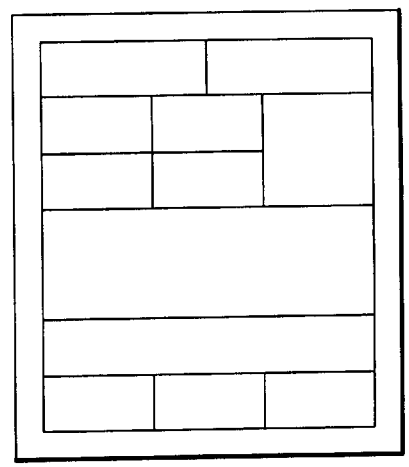
FIG. 20 shows an example of the existing page.
FIG. 21 shows the modified page.
FIG. 22 shows an overlay page that is combined with the existing page.

FIG. 19 illustrates the fifth embodiment. Facsimile machine A begins by sending facsimile machine B a two-page document C, comprising pages one and two, with subaddress 001*02*00. Page two comprises formatted text data, as illustrated in FIG. 20. Facsimile machine B stores pages one and two as message number two in mailbox M.

Afterward, the user of facsimile machine A decides to add ruled lines to page two, as in FIG. 21, and prepares an overlay page having the ruled lines without the text data, as shown in FIG. 22. The user sets this overlay page (page 2') in facsimile machine A and enters a combine command code (05), designating the same box number (001) and message serial number (02) as before, and giving the page number of the page that is to be combined with the overlay page (02). Facsimile machine A originates another call to facsimile machine B and sends a SUB signal, followed by a subaddress comprising the box number (001) and message serial number (02), the combine command code (05), and the designated page number (02). Facsimile machine B receives the overlay page (page 2') and combines it with the existing page two (page 2) to create a new page (page 2'). The newly created page is stored in mailbox M in place of the previously received page two, which is deleted. When the message is printed, page two is printed as shown in FIG. 21, with both text and ruled lines.

Figure 23:
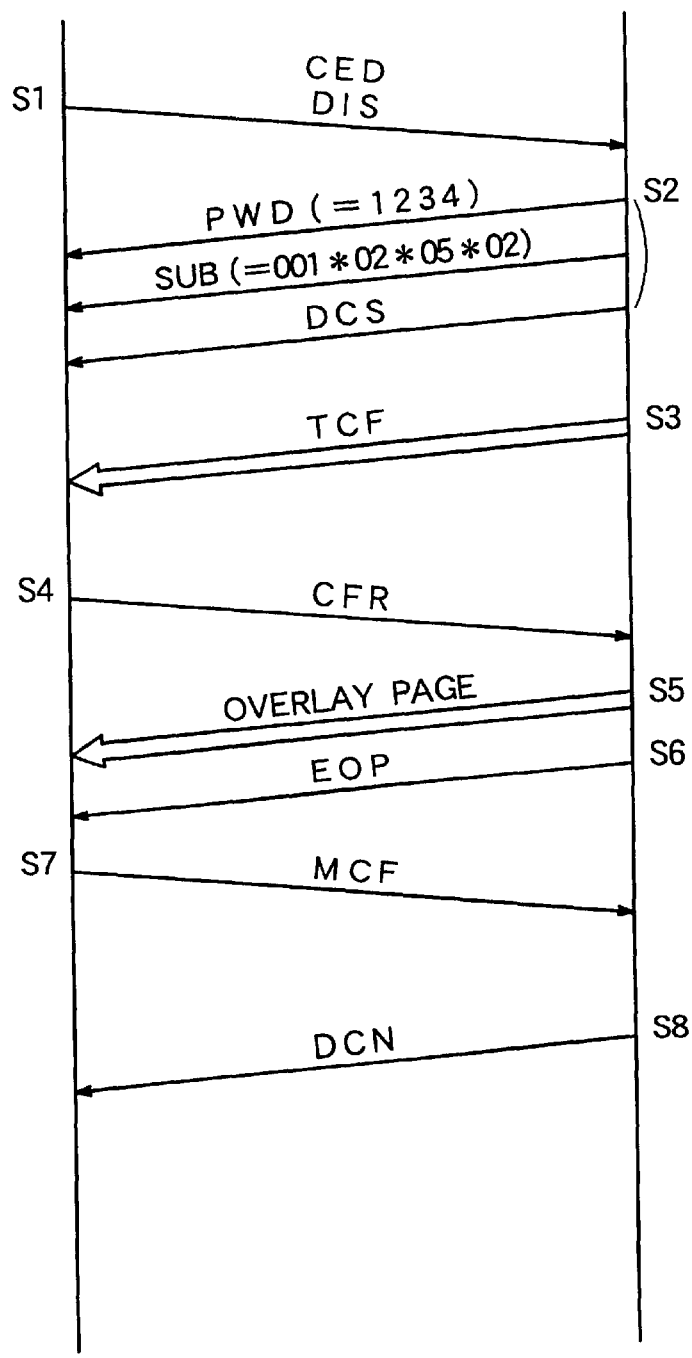
FIG. 23 is a protocol sequence diagram illustrating the transmission of the overlay page.

FIG. 23 illustrates the signaling sequence when page two is thus modified. After receiving a called station identification signal (CED) and digital identification signal (DIS) from facsimile machine B (step S1), facsimile machine A sends a password (1234) and subaddress signal (SUB), followed by the subaddress 001*02*05*02, then a digital command signal (step S2). The last two parts of the subaddress instruct facsimile machine B to combine new image data with page two of the message designated by the first two parts of the subaddress. After a training check (step S3) and confirmation to receive (step S4), facsimile machine A sends the new image data of page two (step S5), followed by an end-of-procedures signal (step S6). Facsimile machine B returns a message confirmation signal (step S7), and facsimile machine A sends a disconnect signal (step S8) to end the transmission.

Figure 24:
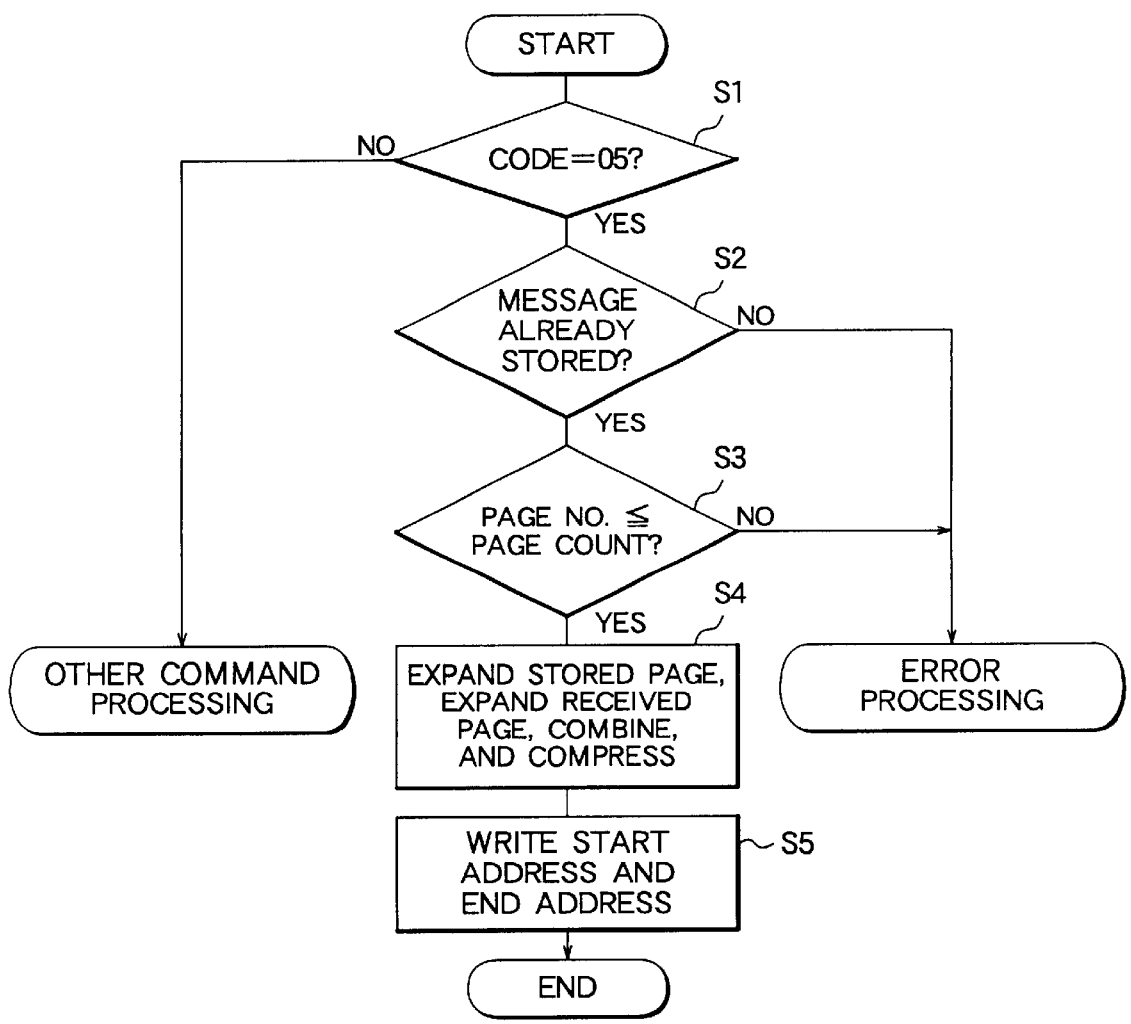
FIG. 24 is a flowchart illustrating the reception of the overlay page.

FIG. 24 illustrates the procedure followed by facsimile machine B. The combine command code (05) is recognized in the subaddress check (step S1). The message serial number is checked (step S2), and error processing is performed if no message is stored under the indicated message serial number. The page number designated in the subaddress is checked (step S3), and error processing is performed if the designated page is not stored.

If these checks pass, the existing compressed image data of the designated page are read from the mailbox area in the RAM 4, expanded by the image codec 6, and stored in expanded form in a temporary storage area in the RAM 4. As the overlay page two is received, it is also expanded by the image codec 6, and combined with the existing page two by, for example, OR logic. The image codec 6 then compresses the combined image data, which are stored in mailbox M in the RAM 4 as the new image data of page two (step S4).

Finally, the information in the message control table describing page two of message number two in mailbox M is updated by writing the start address and end address between which the combined compressed image data are stored (step S5). If necessary, the page size, resolution, and coding method may also be updated.

When message number two is printed, page one is printed as originally received, and the newly created combined page is printed as page two.

The fifth embodiment is particularly useful when the same information needs to be added to a large number of pages that have already been transmitted, because it is more efficient to transmit the new information only once, instead of sending a revised version of every page. For example, the fifth embodiment enables the user of facsimile machine A to add a "CONFIDENTIAL" stamp to pages that have already been transmitted, without having to retransmit the pages. The subaddress in this case designates a list of pages that are to be overlaid with new image data, or a range of page numbers, or gives a special code indicating that all pages of the message are to be overlaid.

As described above, when a facsimile document is stored in a mailbox at the receiving facsimile machine, the present invention enables the sending party to alter the stored document before the document is printed by the receiving facsimile machine. One use of the invention is to add remaining pages to a facsimile transmission that was interrupted because the receiving mailbox became full during the transmission, but there are many other uses, as shown in the embodiments above.

For simplicity in the preceding description, the message serial numbers employed at both facsimile machines were matching two-digit numbers from 00 to 99, entered by the user at the transmitting facsimile machine. In practice, the two facsimile machines may employ different numbering systems. In one exemplary scheme, a user wishing to alter the contents of a message already transmitted from facsimile machine A has facsimile machine A print a numbered list of recent transmissions, giving the time, date, and destination of each transmission. This information is read from a transmission log stored in the RAM 4 of facsimile machine A. The user uses the time, date, and destination information to identify the message that is to be altered, and enters the number of the message on the list. In the subaddress, facsimile machine A sends the time and date of the previous transmission to facsimile machine B, instead of sending the number entered by the user. Facsimile machine B reads its own log of received facsimile transmissions, finds a message sent to mailbox M from facsimile machine A at the specified time and date, and determines the message serial number under which this message is stored in mailbox M.

The present invention is not limited to facsimile transmissions addressed to mailboxes, but can be used with any type of facsimile transmission that is stored in a memory in the receiving facsimile machine and printed later, instead of being printed as soon as received.

The present invention is not limited to facsimile machines as such, but can be practiced in other communication machines, such as personal computers, that send and receive messages comprising image data, and store received messages in a memory before output of the messages. Message output is not limited to printing, but may take the form of displaying the received image data on a screen, such as the display screen of the control panel 15, or of transferring the image data to another communication device, such as another facsimile machine.

A feature of the present invention is that facsimile machine A is able to alter a transmitted document by having facsimile machine B alter information stored in a message control table, but the structure of the message control table is not restricted to the structure shown in FIG. 6. For example, the blocks of page information can be linked by pointers, instead of being stored in consecutive order, to avoid the need for copying of their information when pages are inserted or deleted.

Those skilled in the art will recognize that further variations are possible within the scope claimed below.

What is claimed is:

1. A data transmission method, comprising the steps of originating a communication from a first communication machine to a second communication machine having a memory storing image data;
   a transmitting signals defined in Recommendation T.30 of the Telecommunication Standardization Sector of the International Telecommunication Union (ITU-T) from said first communication machine to said second communication machine, including a command to modify the image data stored in said memory; and altering the image data stored in said memory in said second communication machine according to said command.

2. The method of claim 1, further comprising the step of:
   transmitting new image data from the first communication machine to the second communication machine, wherein the image data stored in said memory are altered by adding said new image data following the image data stored in said memory.

3. The method of claim 1, wherein said second communication machine alters the image data stored in said memory by altering control information associated with said image data according to said command.

4. The method of claim 1, wherein said memory has a mailbox area.

5. The method of claim 4, wherein said first communication machine uses a SUB signal to specify said mailbox area.

6. The method of claim 5, wherein said first communication machine also uses said SUB signal to specify the image data to be altered, and the type of alteration to be made.

7. A communication machine for transmitting and receiving commands to alter stored image data, comprising a memory for storing the image data, wherein the communication machine receives signals from a second communication machine, the signals defined in Recommendation T.30 of the Telecommunication Standardization Sector of the International Telecommunication Union (ITU-T), the signals including a command to modify the image data stored in the memory, wherein the communication machine alters the stored image data in the memory according to the command.

8. A data transmission method, comprising the steps of:
   originating a communication from a first communication machine to a second communication machine having a memory storing image data; transmitting a command to modify the image data stored in said memory from said first communication machine to said second communication machine;
   A transmitting new image data from the first communication machine to the second communication machine; and
   altering the image data stored in said memory in said second communication machine according to said command by inserting said new image data between two contiguous parts of the image data stored in said memory.

9. A data transmission method, comprising the steps of:
   originating a communication from a first communication machine to a second communication machine having a memory storing image data;
   transmitting a command to modify the image data stored in said memory from said first communication machine to said second communication machine; and
   altering the image data stored in said memory in said second communication machine according to said command by deleting at least part of the image data stored in said memory.

10. A data transmission method, comprising the steps of:
    originating a communication from a first communication machine to a second communication machine having a memory storing image data;
    transmitting a command to modify the image data stored in said memory from said first communication machine to said second communication machine;
    transmitting new image data from the first communication machine to the second communication machine; and
    altering the image data stored in said memory in said second communication machine according to said command by replacing at least part of the image data stored in said memory with said new image data.

11. A data transmission method, comprising the steps of:
    originating a communication from a first communication machine to a second communication machine having a memory storing image data;
    transmitting a command to modify the image data stored in said memory from said first communication machine to said second communication machine;
    transmitting new image data from the first communication machine to the second communication machine; and
    altering the image data stored in said memory in said second communication machine according to said command by overlaying said new image data on at least part of the image data stored in said memory.

* * * * *